US010865005B2

(12) United States Patent
Miller et al.

(10) Patent No.: US 10,865,005 B2
(45) Date of Patent: Dec. 15, 2020

(54) BAGGER SAFETY SYSTEM

(71) Applicant: Automated Packaging Systems, LLC, Streetsboro, OH (US)

(72) Inventors: Chris Miller, Solon, OH (US); Mark Stultz, Stow, OH (US)

(73) Assignee: Automated Packaging Systems, LLC, Streetsboro, OH (US)

( * ) Notice: Subject to any disclaimer, the term of this patent is extended or adjusted under 35 U.S.C. 154(b) by 259 days.

(21) Appl. No.: 15/995,279

(22) Filed: Jun. 1, 2018

(65) Prior Publication Data

US 2018/0347754 A1 Dec. 6, 2018

Related U.S. Application Data

(60) Provisional application No. 62/513,520, filed on Jun. 1, 2017.

(51) Int. Cl.
*B65B 57/00* (2006.01)
*B65B 43/26* (2006.01)
(Continued)

(52) U.S. Cl.
CPC .......... *B65B 57/005* (2013.01); *B65B 43/123* (2013.01); *B65B 43/267* (2013.01);
(Continued)

(58) Field of Classification Search
CPC .......... B65B 7/02; B65B 7/06; B65B 43/123; B65B 43/267; B65B 43/36; B65B 51/146;
(Continued)

(56) References Cited

U.S. PATENT DOCUMENTS 3,254,828 A  6/1966 Lerner
3,792,260 A * 2/1974 Stewart et al. ......... F16P 3/144
250/215

(Continued)

FOREIGN PATENT DOCUMENTS

DE    102004022408 A1 * 12/2005 .............. F16P 3/144

OTHER PUBLICATIONS

International Search Report and Written Opinion from PCT/US18/35540 dated Aug. 31, 2018 (12 pages).

*Primary Examiner* — Stephen F. Gerrity
(74) *Attorney, Agent, or Firm* — Jon M. Isaacson

(57) ABSTRACT

A bagger safety system includes a controller, a heating element, a light-emitting device, a light-detecting device and a backing assembly. The backing assembly includes a backing bar, a pair of reflectors and a seal backing element movably coupled to the backing bar by at least one mechanical force generating member so as to create a space between the seal backing element and the backing bar when no external force is applied to the mechanical force generating member. Light emitted from a light-emitting device reflects off the reflectors to the light-detecting device when no external force is applied to the mechanical force generating member. Movement of the seal backing element toward the backing bar prevents light emitted from the light-emitting device from reaching the light-detecting device and the controller controls movement of the backing assembly toward the heating element based on whether light from light-emitting device reaches the light-detecting device.

12 Claims, 36 Drawing Sheets

(51) Int. Cl.
*B65B 43/36* (2006.01)
*B65B 43/12* (2006.01)
*B65B 51/14* (2006.01)
*F16P 3/14* (2006.01)
*B65D 33/00* (2006.01)
*G01V 8/14* (2006.01)

(52) U.S. Cl.
CPC ............ *B65B 43/36* (2013.01); *B65B 51/146* (2013.01); *B65D 33/002* (2013.01); *F16P 3/144* (2013.01); *G01V 8/14* (2013.01)

(58) Field of Classification Search
CPC ...... B65B 57/005; B65D 33/002; F16P 3/144; G01V 8/12; G01V 8/22
USPC .................. 53/479, 52, 75, 77, 373.7, 374.8
See application file for complete search history.

(56) References Cited

U.S. PATENT DOCUMENTS

| | | | |
|---|---|---|---|
| 4,201,029 A | | 5/1980 | Lerner |
| 4,537,016 A | | 8/1985 | Shanklin et al. |
| 5,289,671 A | * | 3/1994 | Lerner et al. ........... B65B 57/02 53/479 |
| 5,371,521 A | | 12/1994 | Wehrmann |
| 5,551,206 A | | 9/1996 | Fukuda |
| 5,568,718 A | | 10/1996 | Lerner |
| 5,772,565 A | * | 6/1998 | Weyandt ............... B65B 51/146 493/10 |
| 6,543,201 B2 | | 4/2003 | Cronauer et al. |
| 2004/0070751 A1 | * | 4/2004 | Bergbach et al. ...... F16P 3/144 356/141.3 |
| 2008/0010955 A1 | * | 1/2008 | Lerner et al. ......... B65B 43/267 53/564 |

* cited by examiner

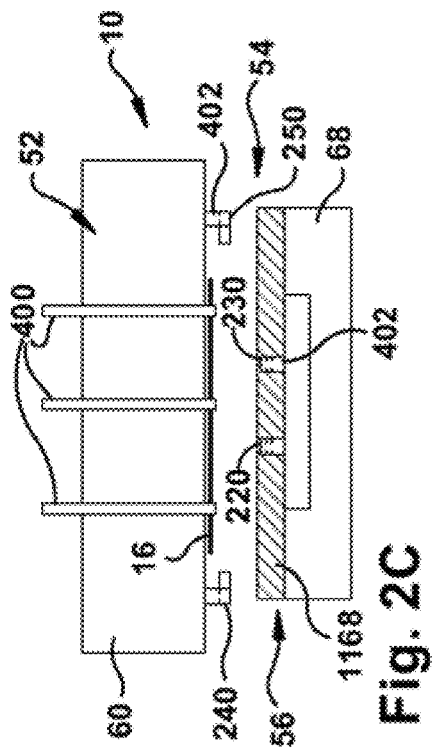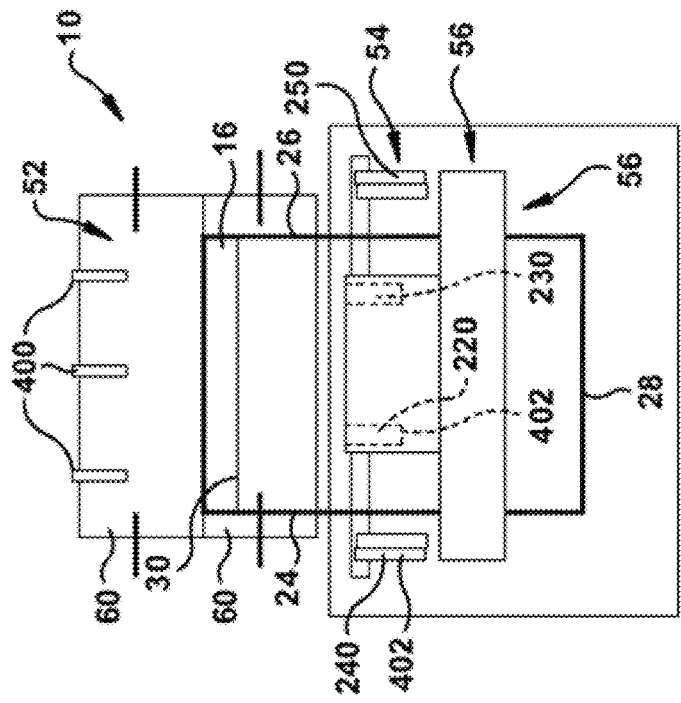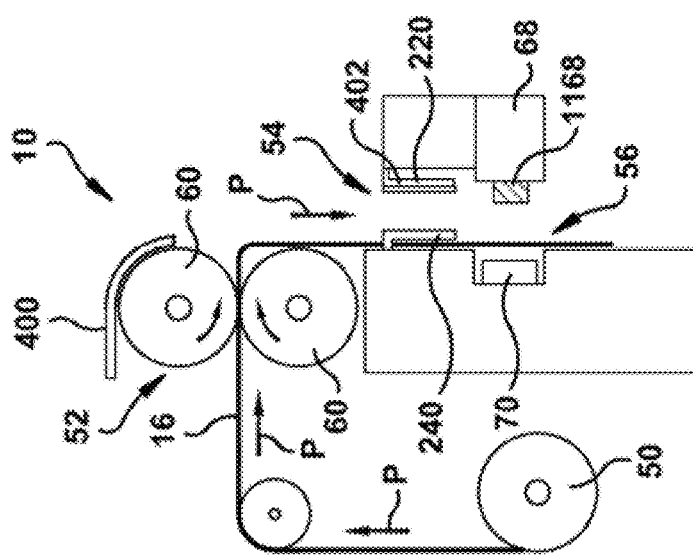

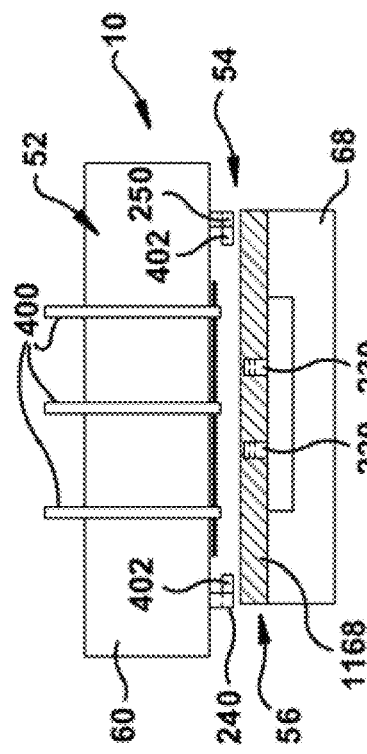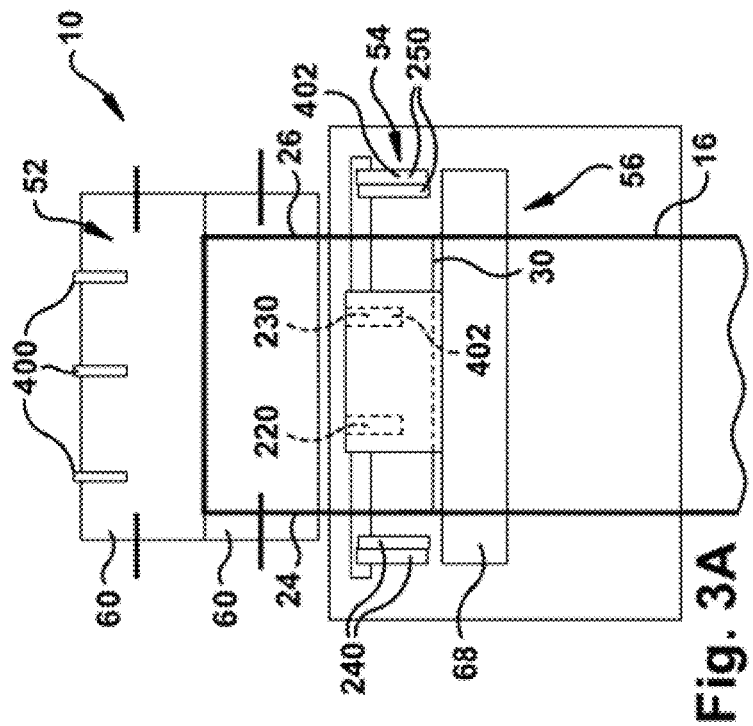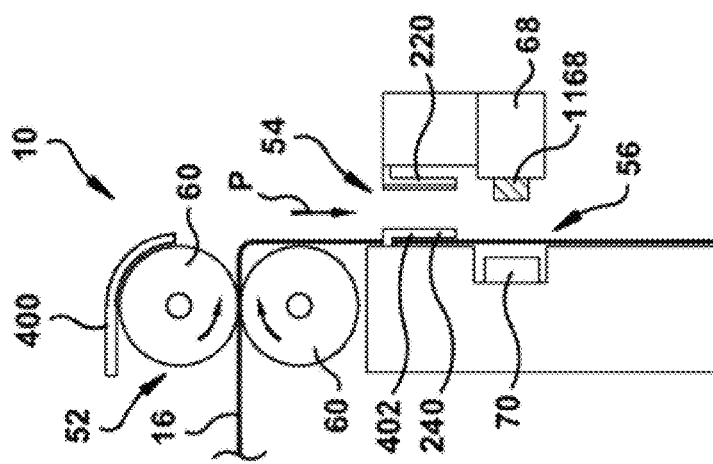

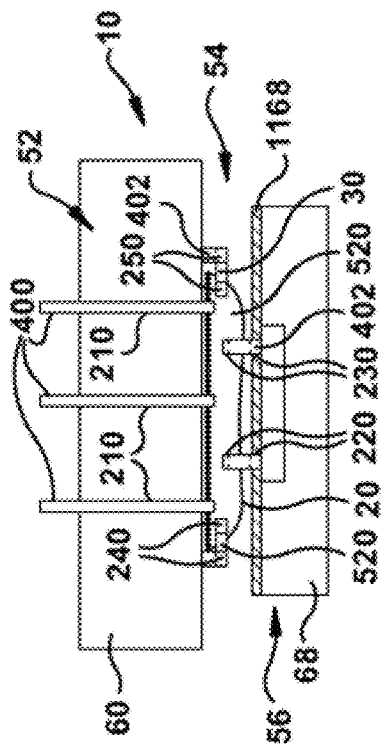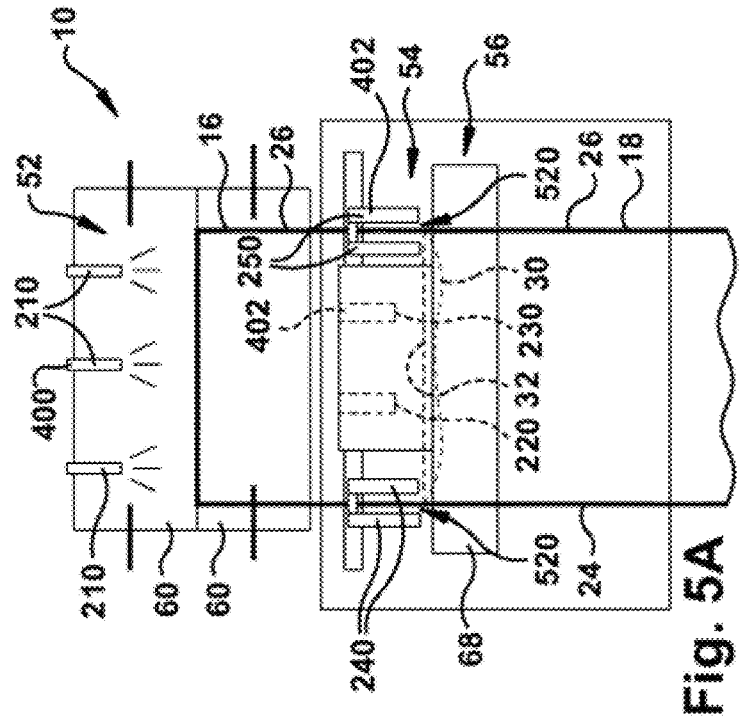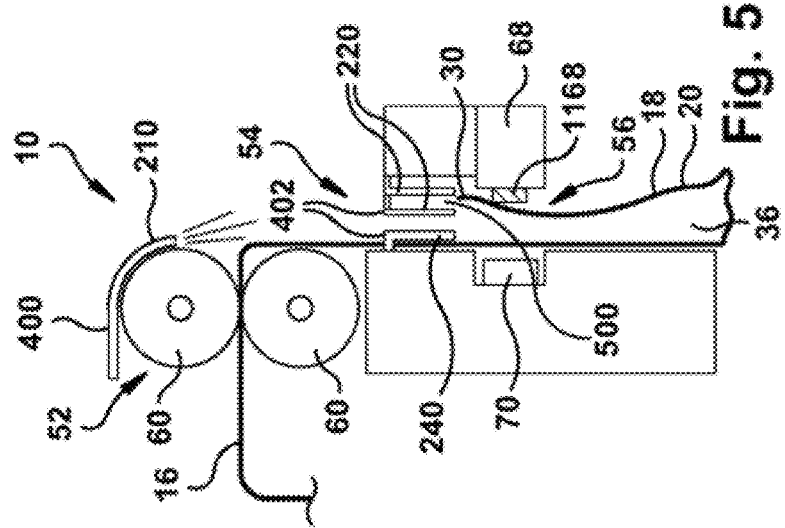

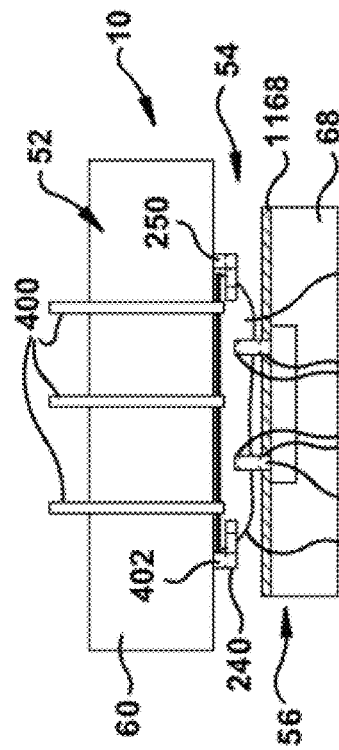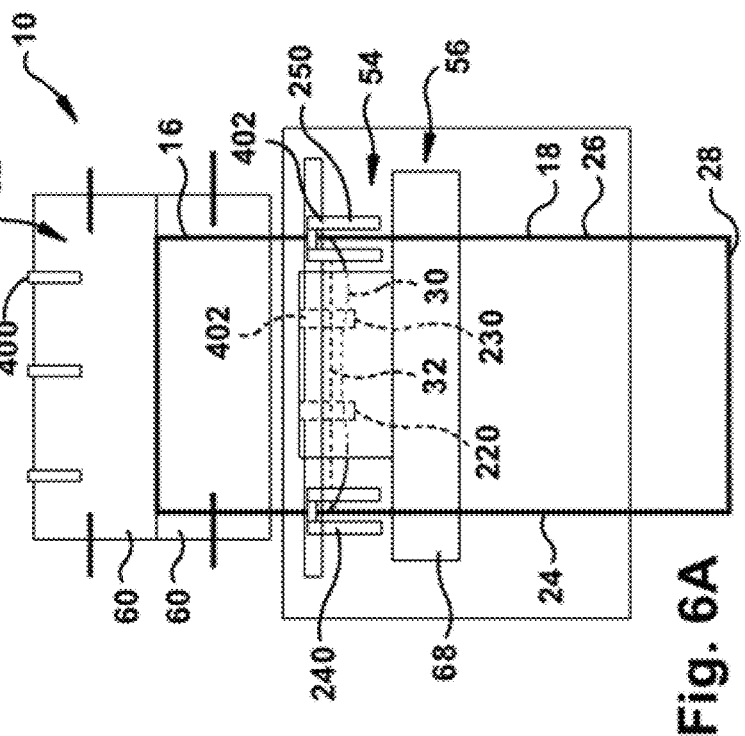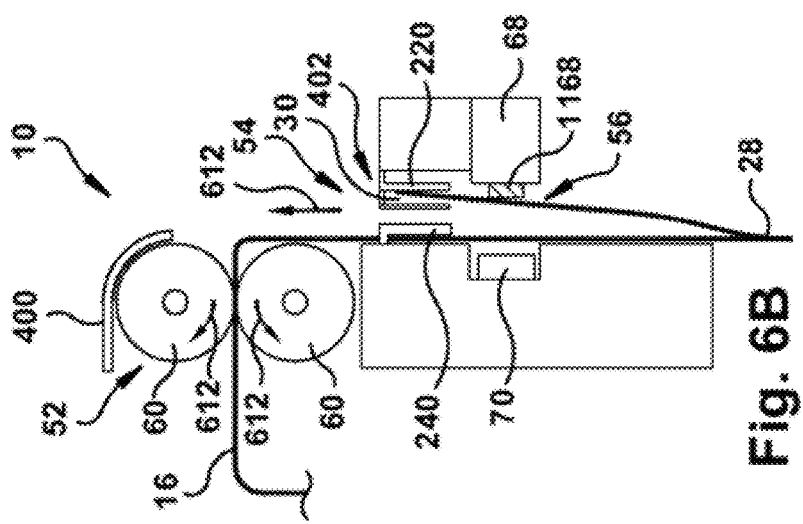

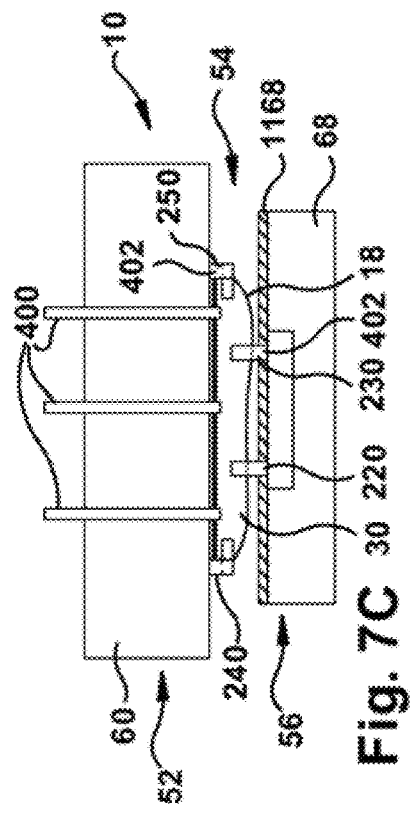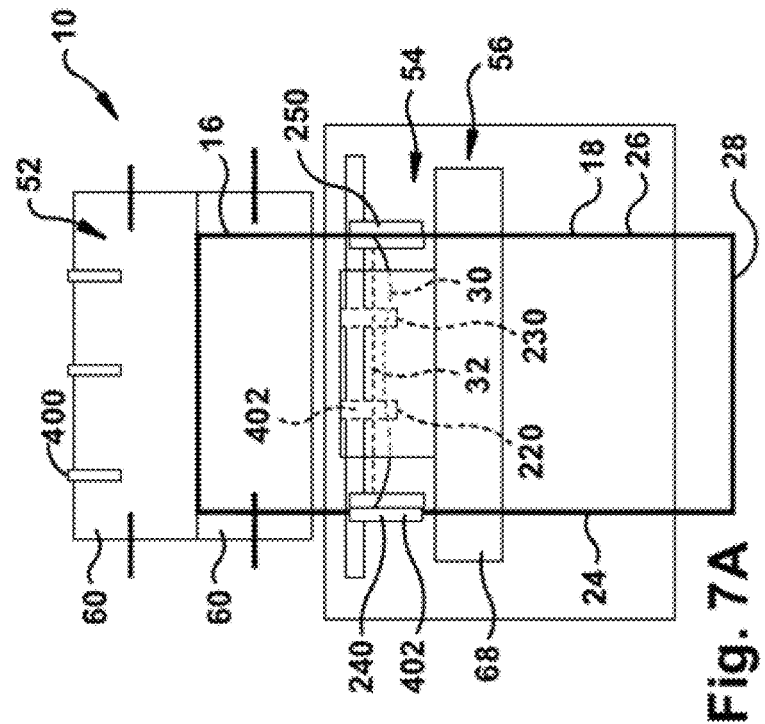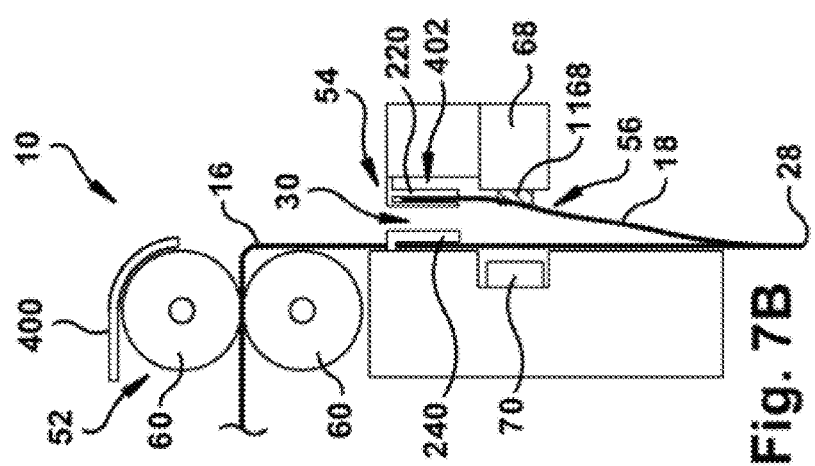

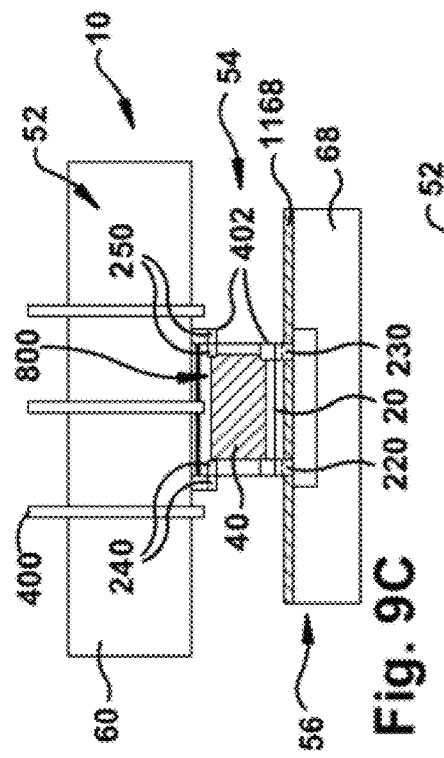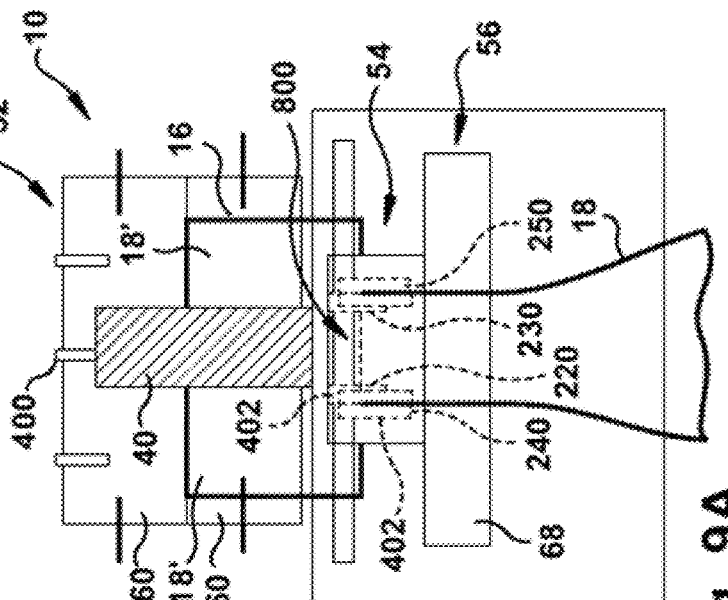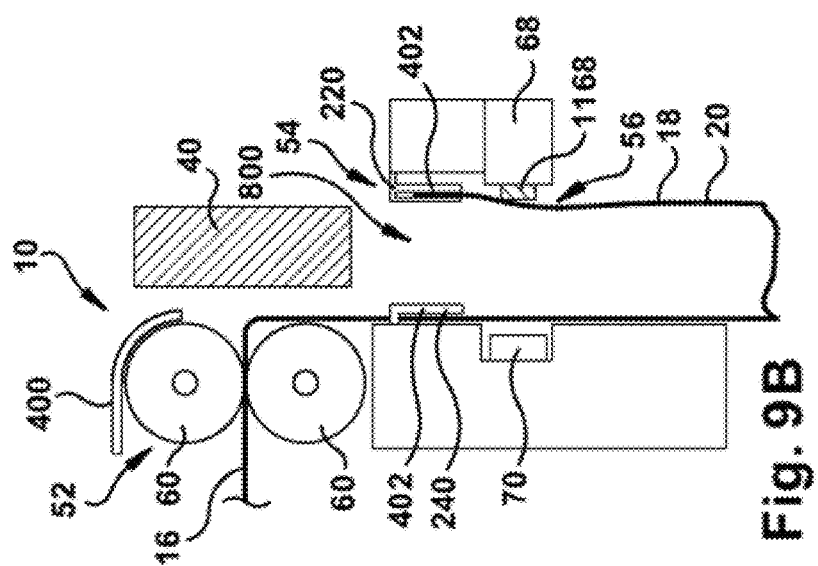

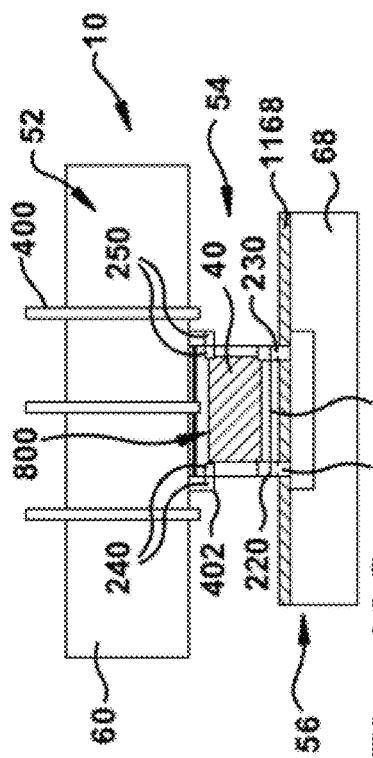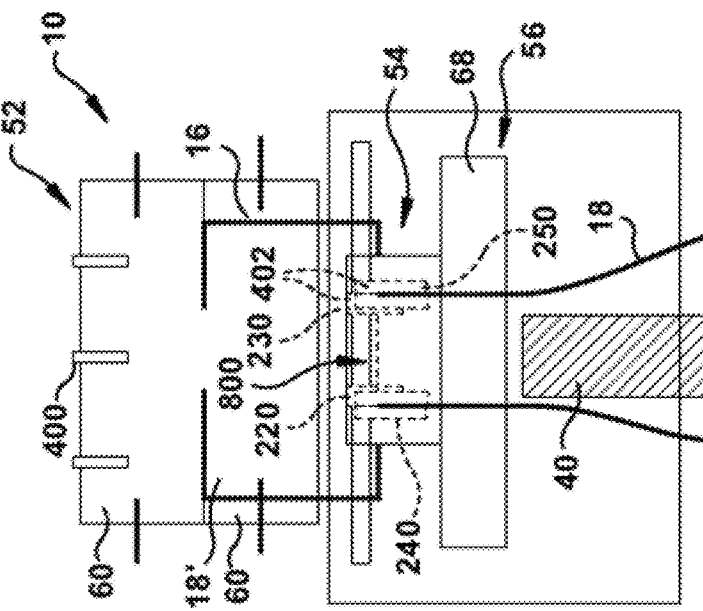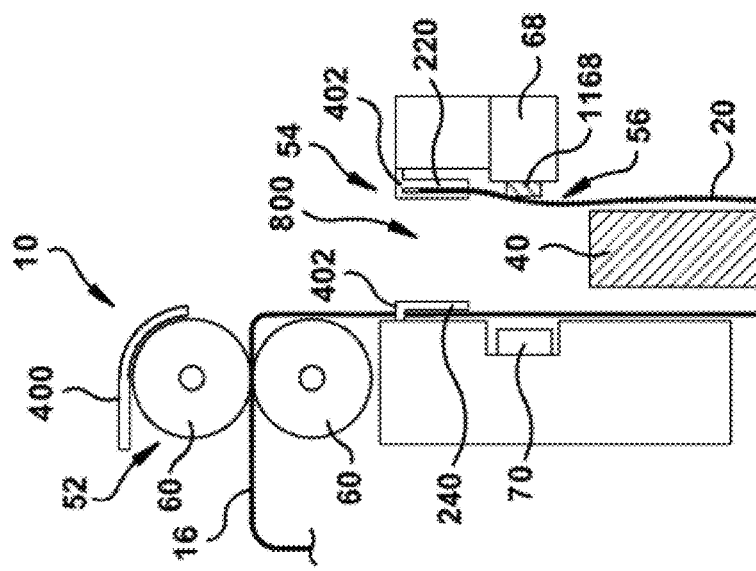

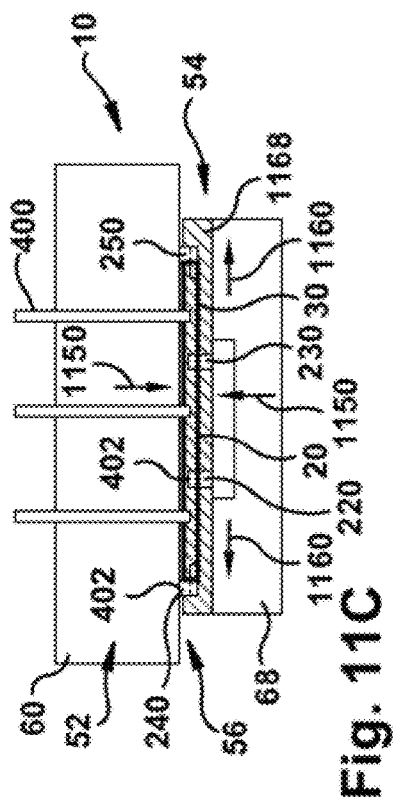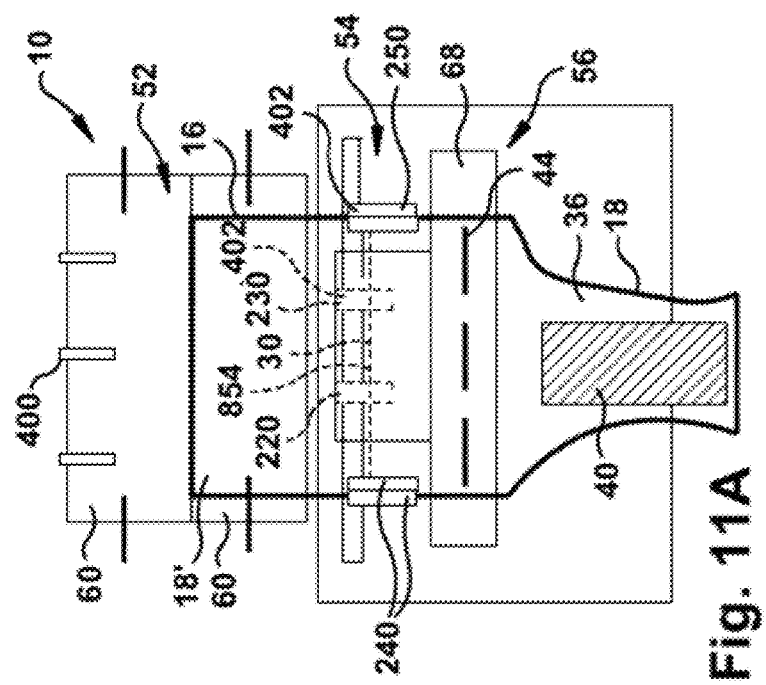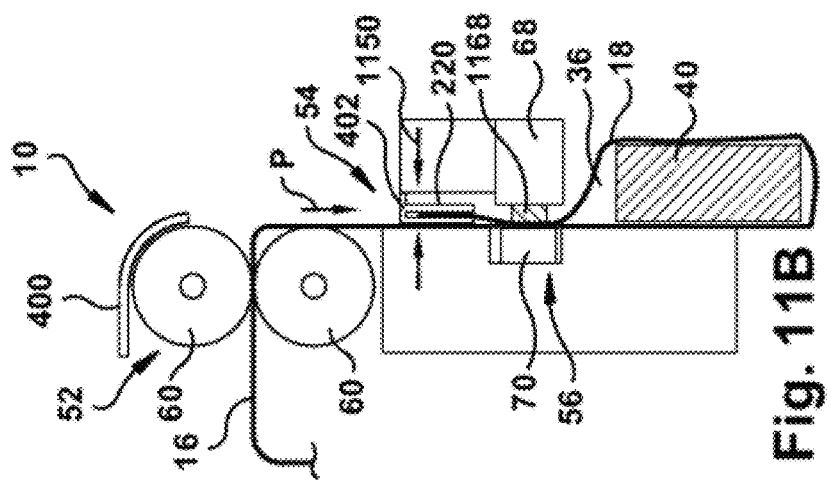

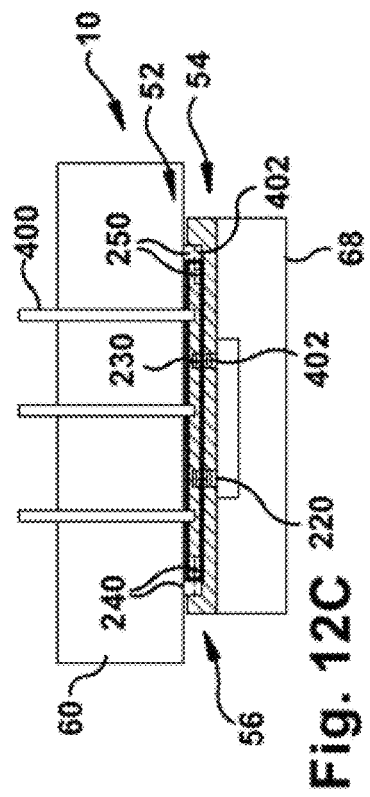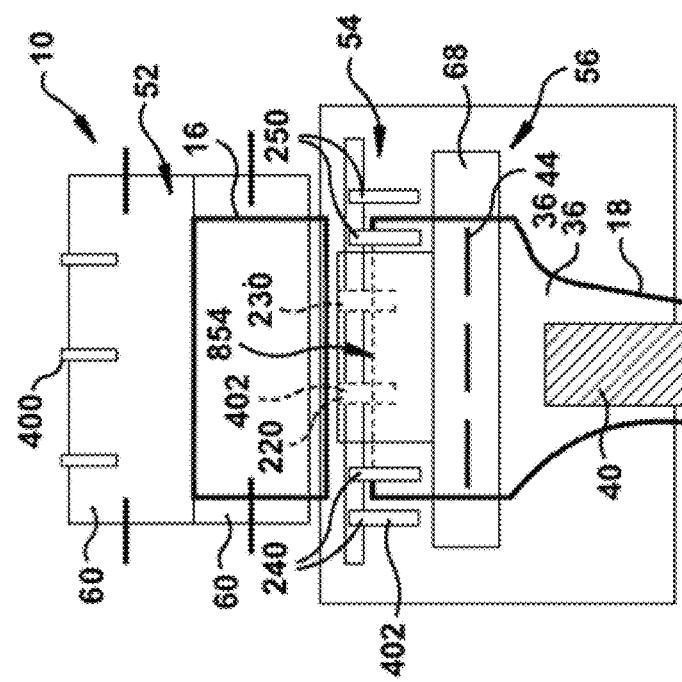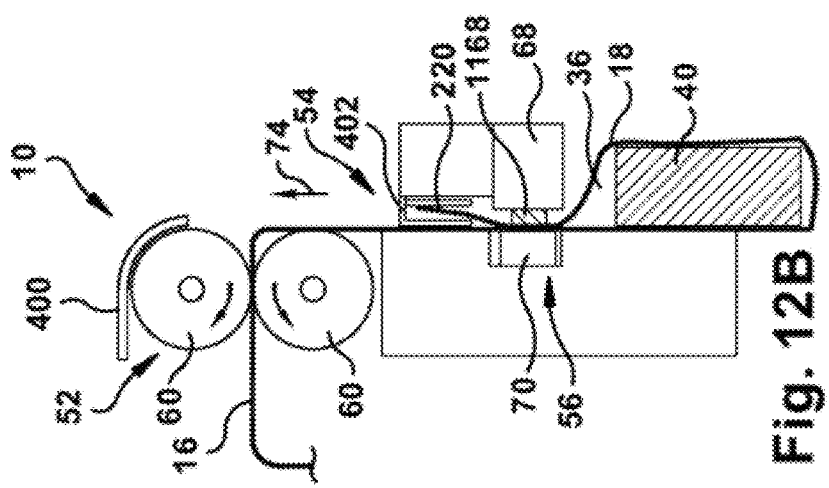

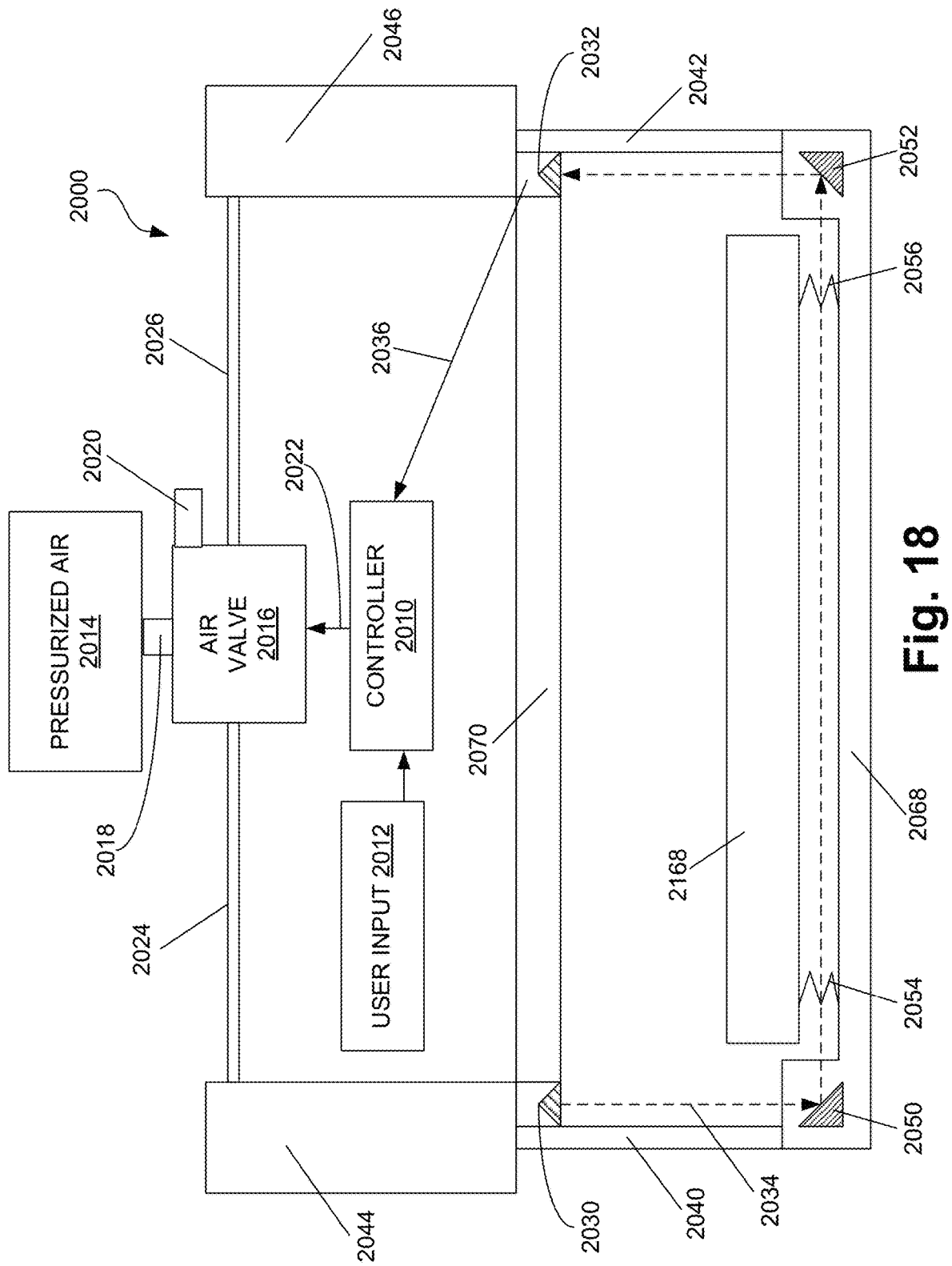

BAGGER SAFETY SYSTEM

RELATED APPLICATIONS

The present patent application claims the benefit of U.S. Provisional Patent Application No. 62/513,520, filed on Jun. 1, 2017, titled "Bagger Safety System," which is incorporated herein by reference in its entirety.

TECHNICAL FIELD

The present application relates generally to packaging and in particular to a safety system for a bagging machine.

BACKGROUND OF THE INVENTION

U.S. Pat. No. 3,254,828, issued Jun. 7, 1966, to Hershey Lerner under the title Flexible Container Strips is directed to so called bags on a roll (here the AutoBag patent). U.S. Pat. No. 3,254,828 is incorporated herein by reference in its entirety. This patent discloses a web of bags interconnected by lines of weakness, preferably in the form of perforations, with each of the bags being open on one face. In use the bags are sequentially fed to a loading station. When at the loading station, each bag is blown open, a product is inserted and thereafter separated from the web and, if desired, the bag is then sealed to form a package.

These container strips in the form of chains of pre-opened bags are supplied either on a roll as taught in the AutoBag patent or festooned in a carton in the manner taught in U.S. Pat. No. 4,201,029, issued May 6, 1980, to Bernard Lerner et al. under the title Method and Apparatus for Packaging, (herein the Wig-Wag patent). Such container strips have been sold by Automated Packaging Systems, Inc. of Streetsboro, Ohio, the assignee of the present case, under the trademark AutoBag and have enjoyed great commercial success.

Light curtains are used in a variety of different types of manufacturing equipment. Light curtains are used in safety systems to protect the operator. Specifically, when an object passes into the light curtain, the manufacturing equipment stops or is disabled.

SUMMARY

Exemplary embodiments of safety systems and methods for use in forming and filling webs of preformed bags are disclosed herein.

In one embodiment, a bagger safety system includes a controller, a heating element, a light-emitting device, a light-detecting device in electrical communication with the controller and a backing assembly. The backing assembly includes a backing bar, a first reflector, a second reflector and a seal backing element movably coupled to the backing bar by at least one first mechanical force generating member so as to create a space between the seal backing element and the backing bar when no external force is applied to the at least one first mechanical force generating member. The backing assembly is disposed opposite the heating element and is movable toward the heating element and movement of the backing assembly is controlled by the controller. Light emitted from the light-emitting device reflects off the first reflector to the second reflector and off the second reflector to the light-detecting device when no external force is applied to the at least once first mechanical force generating member. Movement of the seal backing element toward the backing bar prevents light emitted from the light-emitting device from reaching the light-detecting device and the controller controls movement of the backing assembly based on whether light from light-emitting device reaches the light-detecting device.

BRIEF DESCRIPTION OF THE DRAWINGS

These and other features and advantages of the present invention will become better understood with regard to the following description and accompanying drawings in which:

FIG. 2A is a front view of the apparatus showing the elongated web being advanced through the apparatus;

FIG. 2B is a side view of the apparatus and elongated web shown in FIG. 2A;

FIG. 2C is a top view of the apparatus and elongated web shown in FIG. 2A;

FIG. 3A is a front view of the apparatus showing the elongated web opening being positioned below a bag opening arrangement of the apparatus;

FIG. 3B is a side view of the apparatus and elongated web shown in FIG. 3A;

FIG. 3C is a top view of the apparatus and elongated web shown in FIG. 3A;

FIG. 5A is a front view of the apparatus showing the web opening being blown open above the bag engagement devices;

FIG. 5B is a side view of the apparatus and elongated web shown in FIG. 5A;

FIG. 5C is a top view of the apparatus and elongated web shown in FIG. 5A;

FIG. 6A is a front view of the apparatus showing the web being reverse indexed to position the bag engagement devices inside the web opening;

FIG. 6B is a side view of the apparatus and elongated web shown in FIG. 6A;

FIG. 6C is a top view of the apparatus and elongated web shown in FIG. 6A;

FIG. 7A is a front view of the apparatus showing bag engagement devices engaging a bag of the web at the opening;

FIG. 7B is a side view of the apparatus and elongated web shown in FIG. 7A;

FIG. 7C is a top view of the apparatus and elongated web shown in FIG. 7A;

FIG. 9A is a front view of the apparatus showing a rectangular product positioned above the rectangular bag opening;

FIG. 9B is a side view of the apparatus and elongated web shown in FIG. 9A;

FIG. 9C is a top view of the apparatus and elongated web shown in FIG. 9A;

FIG. 10A is a front view of the apparatus showing a rectangular product positioned in the open bag;

FIG. 10B is a side view of the apparatus and elongated web shown in FIG. 10A;

FIG. 10C is a top view of the apparatus and elongated web shown in FIG. 10A;

FIG. 11A is a front view of the apparatus showing the bag engagement devices moving to close the bag and the bag being sealed by a sealing arrangement of the apparatus;

FIG. 11B is a side view of the apparatus and elongated web shown in FIG. 11A;

FIG. 11C is a top view of the apparatus and elongated web shown in FIG. 11A;

FIG. 12A is a front view of the apparatus showing reverse indexing of the web to separate the filled and sealed bag from the web;

FIG. 12B is a side view of the apparatus and elongated web shown in FIG. 12A;

FIG. 12C is a top view of the apparatus and elongated web shown in FIG. 12A;

FIG. 18 is a schematic diagram of a first exemplary safety system shown prior to starting a sealing process;

DETAILED DESCRIPTION

Figure 1B:
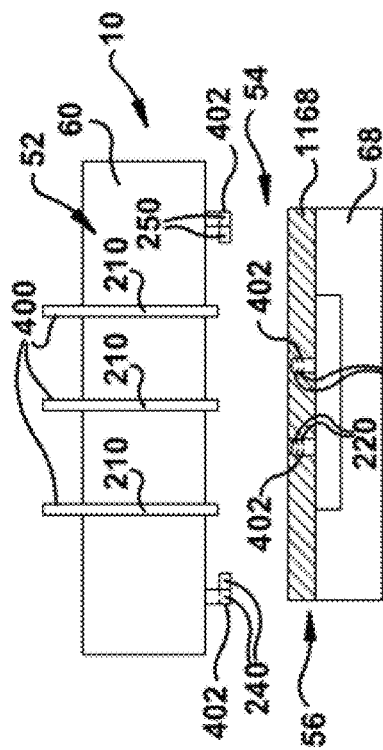
FIG. 1B is a side view of the apparatus shown in FIG. 1A.

Prior to discussing the various embodiments, a review of the definitions of some exemplary terms used throughout the disclosure is appropriate. Both singular and plural forms of all terms fall within each meaning.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

The present application relates to safety systems and methods for creating, filling and sealing webs of pre-formed bags. An elongated web 16 (FIGS. 14 and 15) of preformed interconnected bags 18 and a safety system for loading and sealing the preformed bags (see FIGS. 18-37) is described herein. In an exemplary embodiment, the web 16 has an opening 30 defined in a first ply 20 and a line of separation 32 in a second ply 22. The webs 16 of preformed interconnected bags 18 can take a wide variety of different forms. In the exemplary embodiments illustrated by FIGS. 14 and 15, each preformed bag 18 is defined by first and second plies 20, 22 of the web 16. First and second side edges 24, 26 of the web hermetically join the first and second plies. Preformed seals 28 extend between the first and second side edges 24, 26. The opening 30 extends between the first and second side edges 24, 26. The line of separation 32, such as a line of perforations in the second ply 22 extends between the first and second side edges 24, 26. In one exemplary embodiment, the opening 30 is superposed over the line of perforations 32. In another exemplary embodiment, the opening 30 and the line of perforations 32 are offset.

Figure 14:
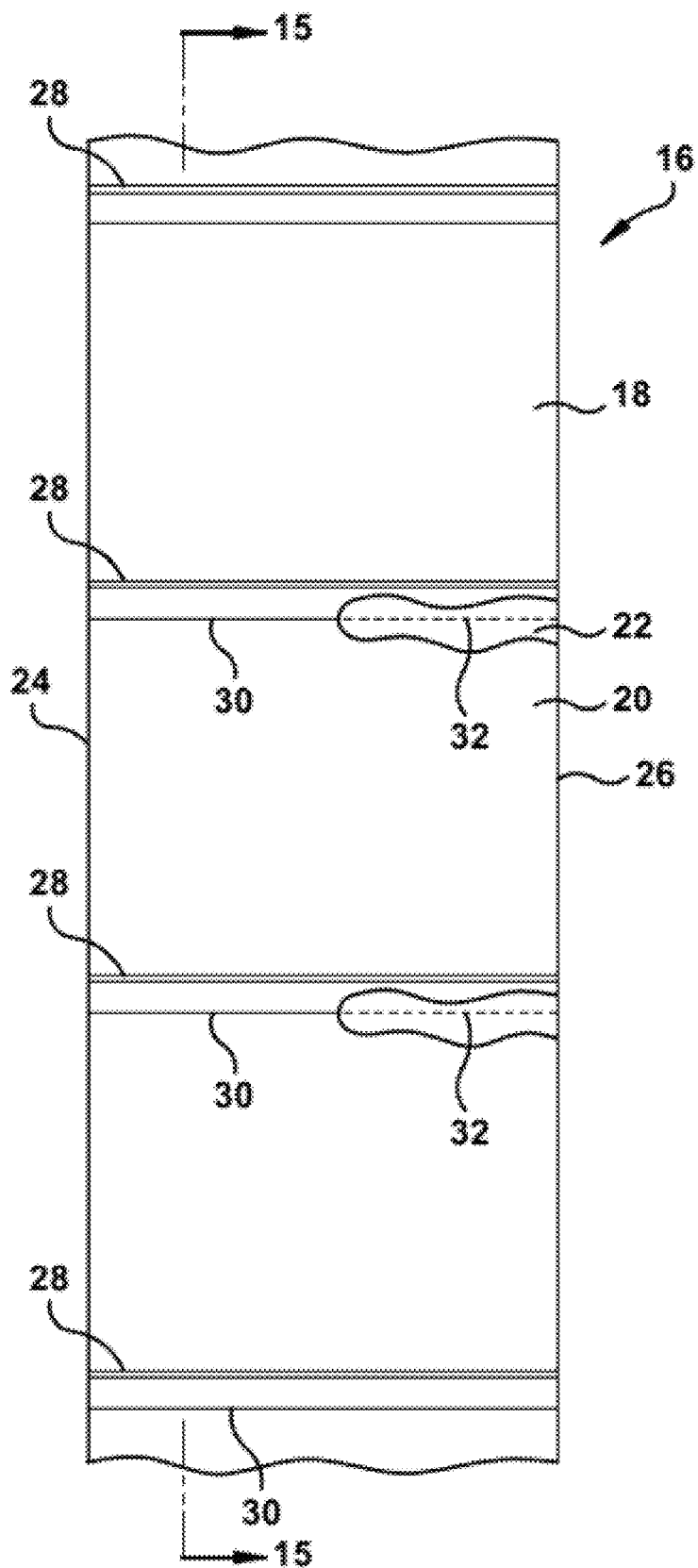
FIG. 14 is a view, partially cut away, of an elongated web of bags.
Figure 15:
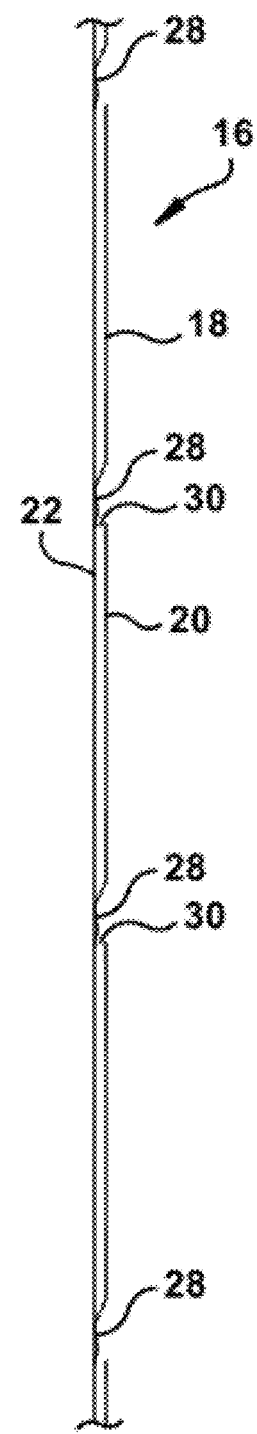
FIG. 15 is a sectional view taken along the plane indicated by lines 15-15 in FIG. 14.

The web 16 of preformed bags 18 illustrated by FIGS. 14 and 15 is one example of the wide variety of different webs that may be used. Examples of acceptable webs of preformed interconnected bags include, but are not limited to, the webs disclosed in U.S. Pat. No. 3,254,828 to H. Lerner and U.S. Pat. No. 5,957,824 to B. Lerner et al., which are incorporated herein by reference in their entirety.

The web 16 may be formed of any suitable material. Examples of suitable materials include, but are not limited to, plastic materials, polyethylene, cellophane, vinyl films, pliofilms, cellulose acetate film, polystyrene, polypropylene, and any heat sealable material.

Figure 17:
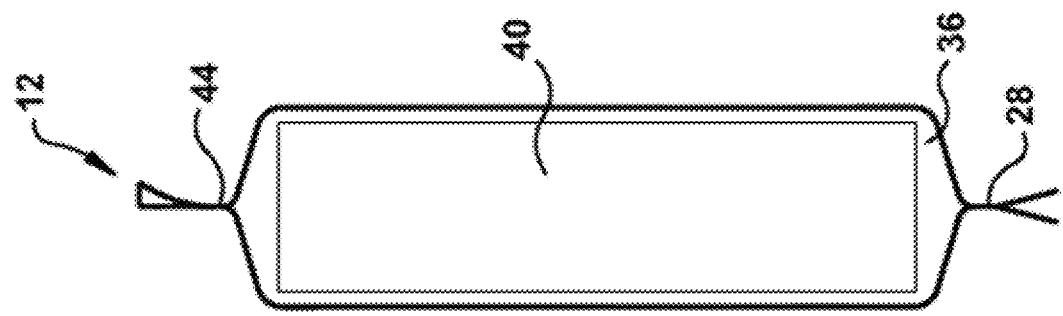
FIG. 17 is a view taken along the plane indicated by lines 17-17 in FIG. 16.
Figure 16:
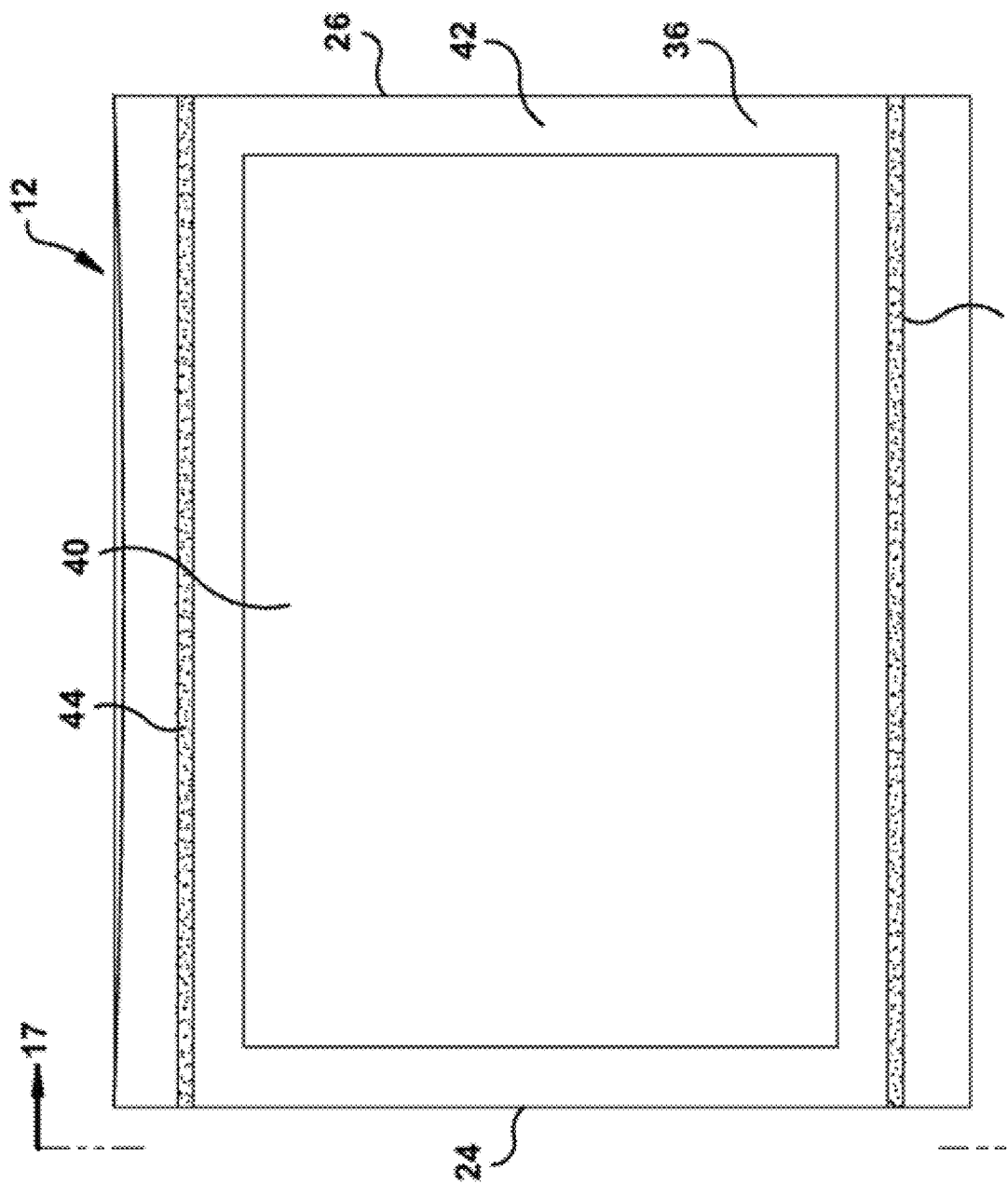
FIG. 16 is a front view of an exemplary embodiment of a package.

Referring to FIGS. 16 and 17, an exemplary package 12 includes a sealed compartment 36.

The package 12 may have any number of compartments. Product 40 is disposed in the compartment 36. The illustrated product 40 is a box. However, the package 12 may contain any product. The compartment is defined by the first and second side edges 24, 26, the preformed seal 28, and a seal 44 that is formed after the product 40 is loaded into the bag. In the example, the seal 44 extends from the first side edge 24 to the second side edge 26 to hermetically seal the compartment 36. In another embodiment, the dividing seal 28 may not extend all the way from the first side edge to the second side edge or may be intermittent to allow communication between the compartment 44 and external air or the compartment 44 and another optional compartment of the package. The webs 16 of interconnected bags 18 can be made in a wide variety of different ways.

Figure 1A:
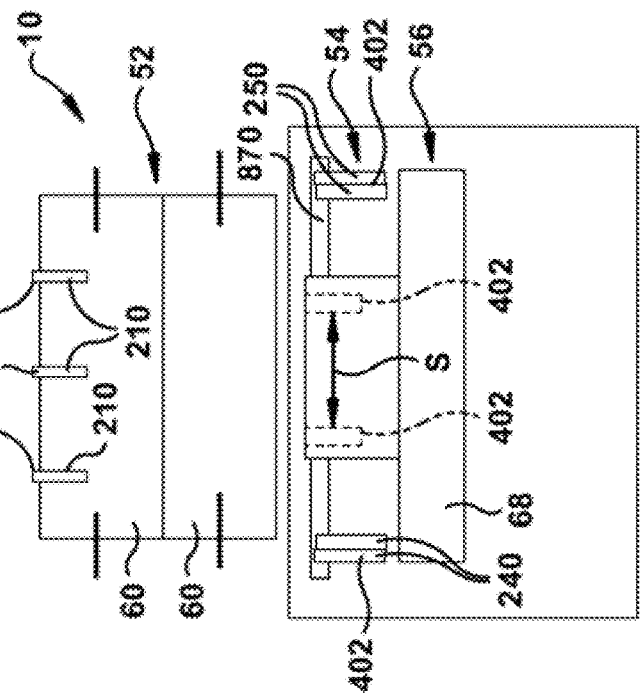
FIG. 1A is a front view of an exemplary apparatus for making packages from an elongated web of preformed interconnected bags.
Figure 1C:
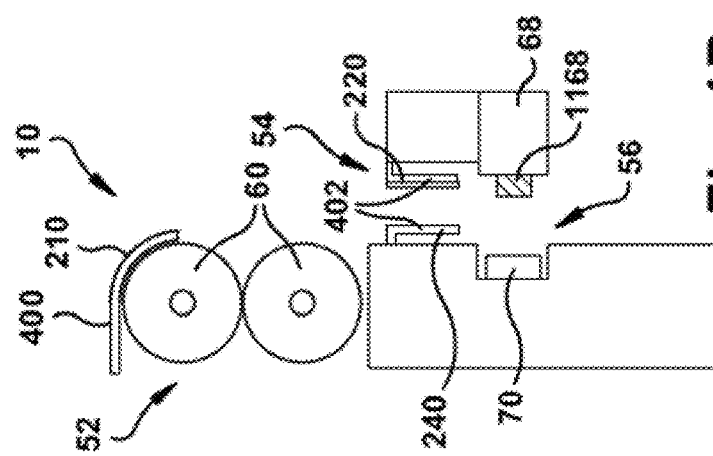
FIG. 1C is a top view of the apparatus shown in FIG. 1A.

The webs 16 of interconnected bags 18 can be used in a wide variety of different applications. For example, the webs 16 of interconnected bags 18 can be used in a wide variety of different packaging machines. FIGS. 1A-1C illustrate an exemplary embodiment of an apparatus 10 or packaging machine for making packages 12 from an elongated web 16 of preformed interconnected bags 18, such as the elongated webs 16 of bags 18 illustrated by FIGS. 14 and 15.

FIGS. 1A-1C through 13A-13C schematically illustrate an exemplary of a machine being operated to make packages 12 from an elongated web 16 of preformed interconnected bags 18. Any apparatus represented by the schematic illustrations of 1A-1C through 13A-13C can be used that performs the functions shown by FIGS. 1A-1C through 13A-13C. The concepts of the apparatus 10 can be implemented in any of a wide variety of packaging machines. For example, U.S. Pat. No. 3,254,468 to H. Lerner, U.S. Pat. No. 4,928,455 to Gereby et al., U.S. Pat. No. 5,341,625 to Kramer, U.S. Pat. No. 5,394,676 to B. Lerner et al., U.S. Pat. No. 6,543,201 to Cronauer et al., U.S. Pat. Nos. 6,742,317, 5,394,676, 5,371,521, and 4,899,520 disclose packaging machines that can be modified in accordance with the present invention to make packages from an elongated web of preformed interconnected bags and are all incorporated herein by reference in their entirety.

Referring now to FIGS. 1A-1C, the illustrated apparatus 10 includes a supply 50 (FIG. 2B) of the elongated web 16 of preformed interconnected bags 18, an indexing mechanism 52, an opening arrangement 54, a sealing arrangement 56, and a controller (not shown). The supply 50 comprises the elongated web 16 that is rolled or folded to stage a relatively large amount of the web in a relatively small space. The web 16 is routed from the supply 50 along a path of travel P to the indexing mechanism 52. The indexing mechanism 52 receives the web 16 from the supply and moves the web along the path of travel P. The indexing mechanism 52 may take a wide variety of different forms. For example, any indexing mechanism that can be controlled to index bags of the web to selected positions along the path of travel may be used. In the illustrated example, the indexing mechanism comprises a pair of rollers 60 that form a nip that engages the web 16. The rollers 60 are selectively driven by a motor (not shown) to index bags of the web to selected positions along the path of travel P.

Referring to FIGS. 1A-1C, the opening arrangement 54 is positioned along the path of travel P to open each bag that is to be loaded and sealed. In the illustrated embodiment, the opening arrangement 54 comprises a blower 400 and an engagement device 402. However, the opening arrangement 54 may take a wide variety of different forms. The blower 400 can take a wide variety of different forms. In the illustrated embodiment, the blower 400 comprises a plurality of nozzles 210 positioned above the rollers 60 of the indexing mechanism 52. The illustrated nozzles 210 are oriented downward to blow air downward past the rollers 60 along the path of travel P of the web 18.

The engagement device 402 can take a wide variety of different forms. In the illustrated embodiment, the engagement device 402 comprises a first pair of grippers 220 and a second pair of grippers 230. The first pair of grippers 220 are spaced apart from the second pair of grippers 230 and both are configured to grip the first ply 20 of the bag 16. In one exemplary embodiment, the spacing S (FIG. 1A) between the grippers 220, 230 is adjustable. This optional spacing may be automatic and controlled by the controller or the spacing may be manually adjusted. This allows the engagement device to provide openings 800 (See FIG. 8) having different widths.

The engagement device 402 also includes a third pair of grippers 240 and a fourth pair of grippers 250. The third pair of grippers 240 and the fourth pair of grippers 250 are moveable relative to one another and are configured to grip the side edges 24, 26 of the bag 18. The third and fourth pairs of grippers 240, 250 are omitted from FIGS. 11B, 12B, and 13B to more clearly illustrate opening of the first and second pairs of grippers 220, 230.

The grippers 220 and 230 grip the opening 30 and move to create the rectangular opening 800 as will be described in more detail below. This rectangular opening allows the large items, such as rectangular items, like boxes to be packaged inside the bag 18. While the opening 800 is shown as a rectangular shape, the opening can be any shape. For example, the opening could be a quadrilateral, a trapezoid, a triangle, or any other shape. The number of grippers used to grip the opening 30 of the bag may be increased or decreased to create the desired opening shape. Different shape openings accommodate different shape packages being inserted into the bags.

Referring to FIGS. 1A-1C, the controller is in communication with the indexing arrangement 52, the opening arrangement 54, and the sealing arrangement 56. The controller controls the indexing arrangement 52, the opening arrangement 54, and the sealing arrangement 56 to convert the preformed bags 18 into packages 12. A wide variety of controllers can be used and programmed to control the indexing arrangement 52, the opening arrangement 54, and the sealing arrangement 56 as described herein. For example, the controller and controller algorithms described in U.S. Pat. No. 5,341,625 to Kramer can be modified to control the indexing arrangement 52, the opening arrangement 54, and the sealing arrangement 56 to form the packages.

Referring to FIGS. 2A-2C and 3A-3C, the controller controls the indexing mechanism 52 to index the web 16 forward along the path of travel as indicated by arrows P, until the opening 30 of the bag 18 is just below the engagement device 402 in the exemplary embodiment. In alternate embodiments, the opening 30 is indexed to other positions. For example, the opening 30 can be indexed to any position where the blower 400 can blow the opening 30 open or at least partially open. For example, the opening 30 may initially be positioned above the engagement device 402, be blown open by the blower 400, and then be moved to the position illustrated by FIGS. 3A-3C.

Figure 4C:
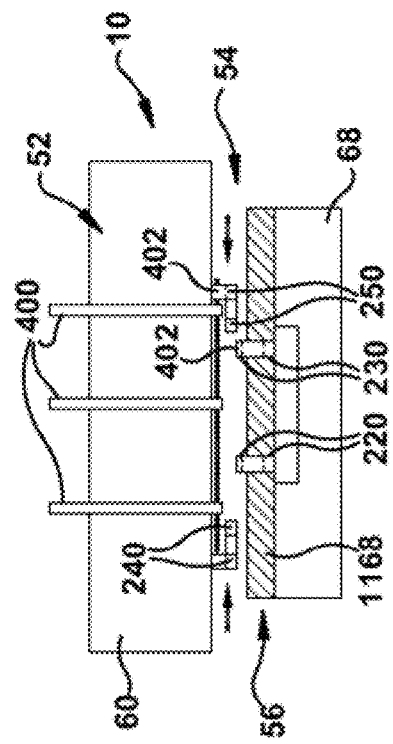
FIG. 4C is a top view of the apparatus and elongated web shown in FIG. 4A.
Figure 4A:
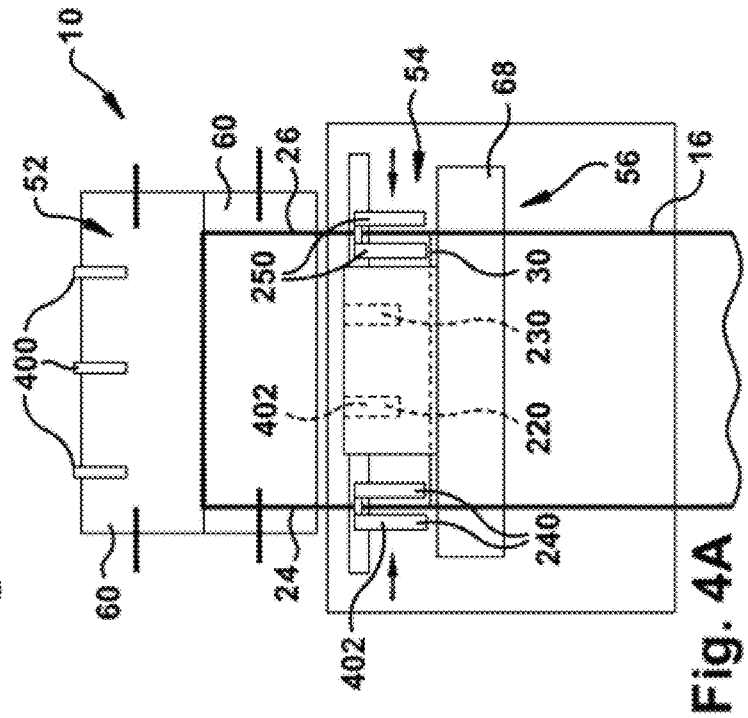
FIG. 4A is a front view of the apparatus showing bag engagement devices moved into position above the elongated web opening.
Figure 4B:
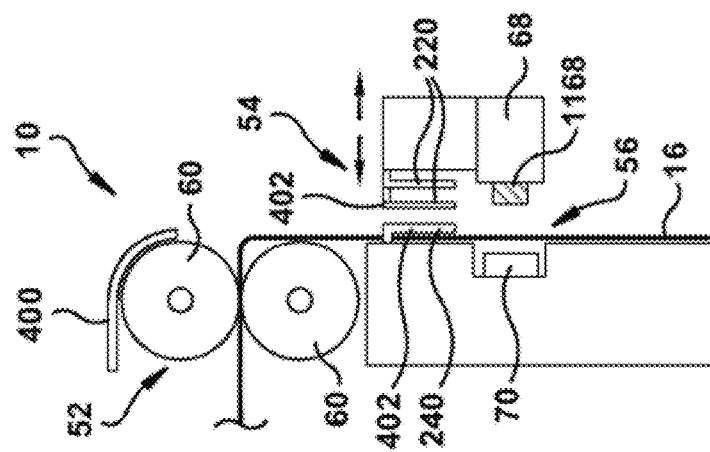
FIG. 4B is a side view of the apparatus and elongated web shown in FIG. 4A.

In an exemplary embodiment, the controller controls the engagement device to move the grippers 220, 230, 240, 250 from a closed position (See FIGS. 3A-3C) to an open position (See FIG. 4A-4C) once the opening 30 is positioned below the engagement device 402. Referring to FIGS. 5A-5C, the controller controls the blower 400 to blow air between the plies 20, 22 at the opening 30 of the bag. The air is forced between the plies through the opening 30 to inflate the bag 18. In an exemplary embodiment, the first ply 20 of the inflated bag 18 is generally aligned with or aligned with a gap 500 (see FIG. 5B) between the gripping members of each pair of open gripper 220, 230. In an exemplary embodiment, the edges of the inflated bag 18 are generally aligned with or aligned with a gap 520 (see FIGS. 5A and 5C) between the gripping members of each open pair of grippers 240, 250. In another embodiment, the bag 18 is not inflated but opened by other means just enough to allow the grippers 220, 230, 240, 250 to be inserted into the opening 30 of the bag.

Referring to FIGS. 6A-6C, in an exemplary embodiment the controller 58 causes the indexing mechanism 52 to reverse index the web as indicated by arrow 612 while the pairs of grippers 220, 230 are open. The blower 400 may optionally be stopped during the reverse indexing. The reverse indexing pulls the first ply 20 of the bag 18 into the gap 500 between the gripping members of each pair of open grippers 220, 230. The reverse indexing also pulls the edges 24, 26 of the bag 18 into the gap 520 between the gripping members of each pair of open grippers 240, 250.

Referring to FIGS. 7A-7C, in an exemplary embodiment the controller 58 causes the pairs of grippers 220, 230, 240, 250 to move from the open position to the closed position. The first ply 20 of the bag 18 is gripped between the gripping members of each of the pairs of gripper 220, 230. The edges 24, 26 of the bag 18 are gripped between the gripping members of each pair of grippers 240, 250.

Figure 8C:
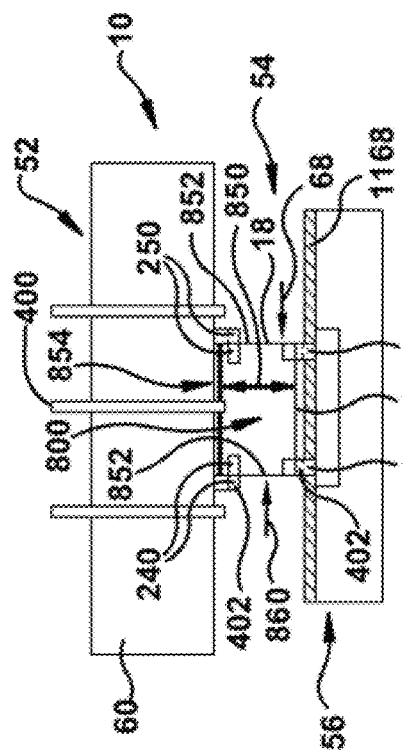
FIG. 8C is a top view of the apparatus and elongated web shown in FIG. 8A.
Figure 8A:
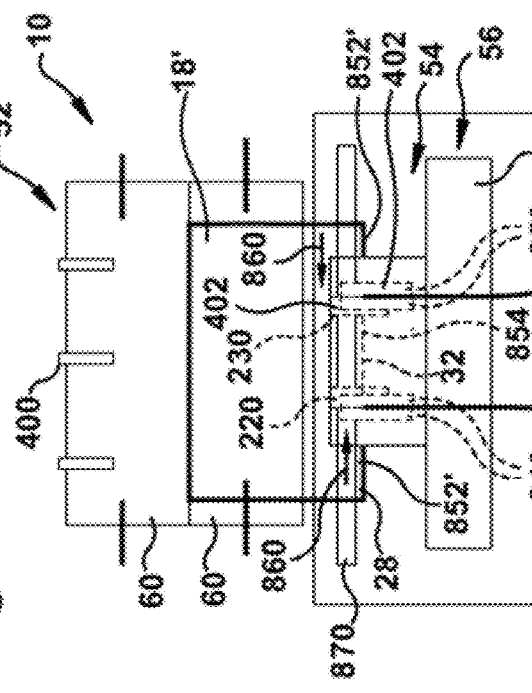
FIG. 8A is a front view of the apparatus showing the engagement devices moving to provide a rectangular bag opening.
Figure 8B:
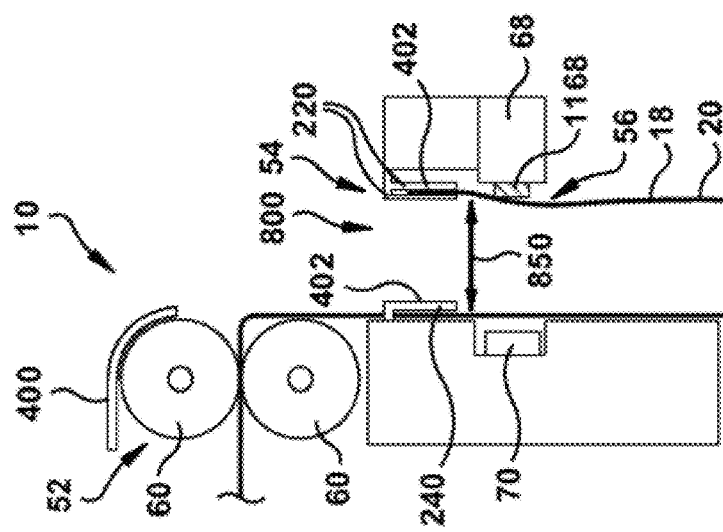
FIG. 8B is a side view of the apparatus and elongated web shown in FIG. 8A.

Referring to FIGS. 8A-8C, each bag 18 is provided with a rectangular opening 800 at a position where the bag is loaded with a product 40. Referring to FIGS. 8A-8C, in an exemplary embodiment, the controller controls the engagement device 402 to provide the bag 18 with the rectangular opening 800 for loading. In the illustrated embodiment, the pairs of gripping members 220, 230 move the first ply 20 away from the second ply 22 as indicated by arrows 850 (see FIGS. 8B and 8C). At the same time, the pairs of gripping members 240, 250 move the edges 24, 26 toward each other as indicated by arrows 860 (see FIGS. 8A and 8C). The movement of the pairs of gripping members 240, 250 tears the line of perforations 32 in the second layer 22. As such, edge portions 852 of the bag 18 are torn away from edge portions 852' of the next bag 18', allowing the rectangular opening 800 to be formed. In one exemplary embodiment, the second ply 22 slides between the pairs of gripping members 240, 250 as the pairs of gripping members 240, 250 move from the position illustrated by FIGS. 7A-7C to the position illustrated by FIGS. 8A-8C. A center portion 854 of the line of perforations 32 in the second layer 22 of the bag 18 remains in-tact. This leaves the bag 18 connected to the bag 18' while the bag 18 has the rectangular opening 800.

The pairs of gripping members 220, 230 can move the first ply 20 away from the second ply 22 in a wide variety of different ways. In the illustrated embodiment, the pairs of gripping members 220, 230 are attached to a bar 68 that is part of the sealing assembly 56. In this embodiment, the bar 68 moves the attached pairs of gripping members 220, 230. However, the pairs of gripping members 220, 230 can be moved by an actuator that is separate from the bar 68. The pairs of gripping members 240, 250 can move the edges 24, 26 toward each other in a variety of different ways. In the illustrated embodiment, the pairs of gripping members 240, 250 move in a slot 870 in a housing of the apparatus 10. The pairs of gripping members 240, 250 can be driven by a motor, a linear actuator or any other mechanism.

Referring to FIGS. 9A-9C and 10A-10C, the bag 18 is maintained with the rectangular opening 800 at the load position and the product 40 is loaded into the bag 18. The product may be loaded manually or automatically. In the illustrated embodiment, the position where the bag 18 is loaded is also the position where bag 18 is sealed after the rectangular opening 800 is closed. In another embodiment, the position where the bag is loaded is different than the position where the bag is sealed. In this embodiment, the controller causes the indexing mechanism 52 to move the bag 18 to the seal position after the bag is loaded with product 40 and closed.

In an exemplary embodiment, once the product is loaded in the bag 18, an operator may provide a signal to the controller that indicates that loading is complete or completion of loading may be automatically detected. The apparatus 10 may be configured to allow the operator to provide the completed loading signal to the controller in a wide variety of different ways. For example, the apparatus may have a control foot pedal (not shown) or the sealing arrangement 56 may have a portion that the operator can push on to indicate that loading is complete and it is time to seal the package. Similarly, the apparatus can be configured to automatically detect completed loading and provide the controller with a signal that indicated this fact. For example, the apparatus may include a counter or may weigh the package to detect completed loading.

Referring to FIGS. 11A-11C, the signal from the operator or detection of completed loading is communicated to the controller, and causes the engagement device 402 to close the bag. In the illustrated embodiment, the pairs of gripping members 220, 230 move the first ply 20 back toward the second ply 22 as indicated by arrows 1150 (see FIGS. 11B and 11C). At the same time, the pairs of gripping members 240, 250 move the edges 24, 26 away from each other as indicated by arrows 1160 to close the bag opening 30 (see FIG. 11C). In an exemplary embodiment, the second ply 22 slides through each of the pairs of gripping members 240, 250 as the pairs of gripping members 240, 250 move from the position illustrated by FIGS. 10A-10C to the position illustrated by FIGS. 11A-11C. In the illustrated embodiment, the center portion 854 of the line of perforations 32 in the second layer 22 of the bag 18 remains in-tact. As such, the closed bag 18 remains connected to the bag 18'.

Still referring to FIGS. 11A-11C, the bag may be sealed at the position illustrated by FIGS. 11A-11C or the engagement device 402 may release the bag and the bag may be indexed to another position for sealing. In one exemplary embodiment, the bag is sealed while the engagement device 402 is holding the bag 18 closed. The sealing arrangement 56 is positioned along the path of travel P to provide the seal 44. The sealing arrangement 56 may take a wide variety of different forms. For example, any mechanism that applies heat to the web to seal the first and second webs together to form the seal 44 may be implemented.

In the illustrated embodiment, the sealing arrangement comprises a seal backing bar 68 and a heating element 70 that are that is selectively moved into and out of engagement. Referring to FIG. 11B, when the web is in the seal position, the controller controls the sealing arrangement 56 to clamp the web 16 between the seal backing bar 68 and the heating element 70. In an exemplary embodiment, the seal backing bar 68 comprises a rubber seal backing element 1168. The seal backing bar 68 may be moved to the clamped position (see FIG. 11B) from the unclamped position (See FIG. 10B) under a low force, such as a force that is lower than a force that could injure a finger that might be between the rubber seal backing element 1168 and the heating element 70. In addition, the rubber seal backing element 1168 is not heated.

In an exemplary embodiment, the heating element 70 is moved to the clamped position (See FIG. 11B) from the unclamped position (See FIG. 10B) and/or heat is applied by the heating element 70 only after the rubber seal backing element 1168 has been moved to the clamped position. Heat is applied to the web to seal the plies of the web together between the first side edge 24 and the second side edge 26. The heating element 70 may be continuously on (i.e. always hot when the machine is turned on) or the heating element 70 may be controlled to only apply heat when the bag 18 is clamped and/or a seal signal is provided by the controller. The first and second plies 20, 22 are sealed together to form the compartment 36.

Referring to FIGS. 12A-12C, the engagement device 402 releases the bag. This release may be after the seal is formed or while the seal is being formed. This release may be before (see FIG. 12B) or after (see FIG. 13B) the seal backing bar 68 and a heating element 70 move apart from one another. In an exemplary embodiment, the controller causes the engagement device 402 to release the bag by causing the grippers 220, 230, 240, 250 to move from the closed position (FIGS. 11A-11C) to the open position (FIGS. 12A-12C).

Still referring to FIGS. 12A-12C, the controller controls the indexing mechanism 52 to separate the formed package 12 from the web 16. The second ply 22 is broken along the remaining middle portion 854 (the middle portion 854 is already broken off in the illustration of FIGS. 12A-12C) of the line of separation 32 to separate the package 12 from the elongated web 16. In the illustrated embodiment, the controller controls the indexing arrangement 52 to pull the web 16 away from the bag 18 as indicated by arrows 74 while the bag is clamped by the sealing arrangement 56 in an exemplary embodiment.

Figure 13C:
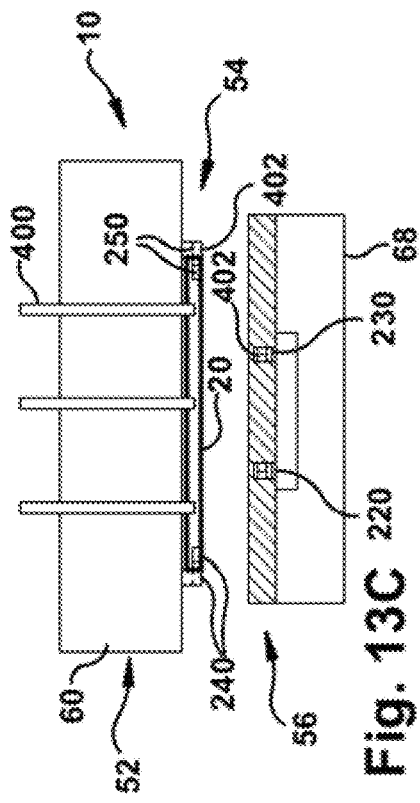
FIG. 13C is a top view of the apparatus and elongated web shown in FIG. 13A.
Figure 13A:
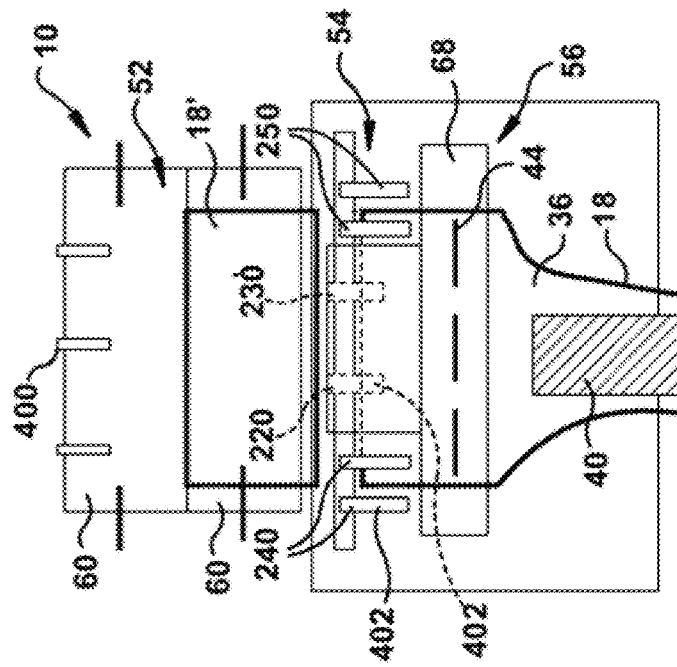
FIG. 13A is a front view of the apparatus showing releasing the filled and sealed bag from the apparatus.
Figure 13B:
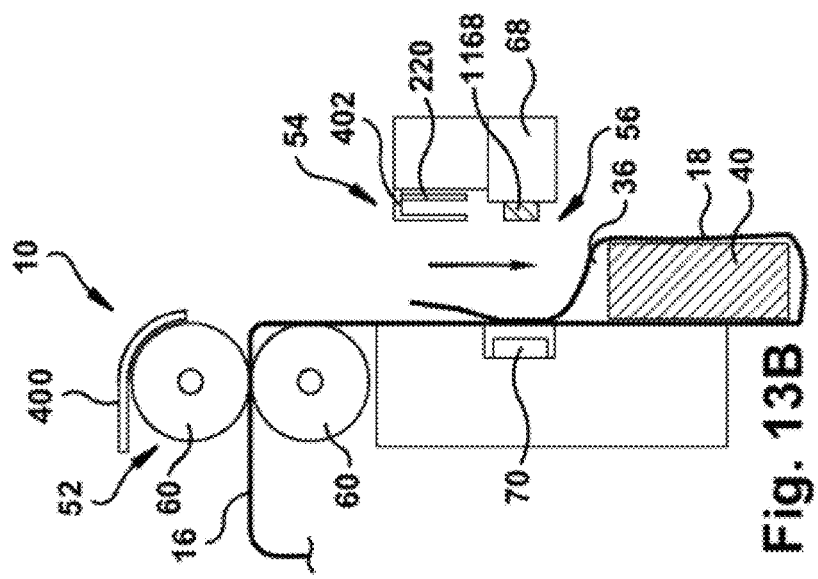
FIG. 13B is a side view of the apparatus and elongated web shown in FIG. 13A.

Referring to FIGS. 13A-13C, the controller controls the sealing arrangement 56 to release the formed package 12 after the filled bag 18 is separated from the next, unfilled bag 18'. In the illustrated embodiment, the formed package 12 is released by moving the seal backing bar 68 away from the heating element 70.

Referring again to FIGS. 3A-3C, the controller 58 indexes the web 16 with the opening 30 of the next bag 18 to the load position and the cycle begins again. The controller may repeat the method as required to produce as many packages as are needed from the web.

The web 16 includes side seals 21 parallel to and proximate the first and second side edges 24, 26. The side seals 21 have a width of about 0.030 inches to about 0.500 inches, such as, for example, 0.100 inches to 0.250 inches. However, the seals 21 may have any range of widths that are within the range of 0.030 inches to 1 inch (i.e. 0.223 to 0.250, 0.8 to 1.0, 0.24 to 0.26, etc., i.e. any sub-range). The relatively thick seals 21 increase the force required to tear a loaded and sealed bag from the remainder of the bags. It should be understood that the embodiments discussed above are representative of aspects of the invention and are provided as examples and not an exhaustive description of implementations of an aspect of the invention.

Referring now to FIG. 18, a safety system 2000 for a bagger device, such as that described above, is shown. The safety system 2000 is used generally to prevent closing of the bagger device on an obstruction while the bagger device is in the process of sealing a bag, such as described in FIGS. 11A-11C and the related description above. It should be noted that one of ordinary skill in the art would be understand that the safety system described herein may be used with other similar bagger devices to prevent closing of the bagger device on an obstruction while operating the device.

FIGS. 18-26 illustrate a first embodiment of a bagger safety system 2000. The safety system 2000 includes a controller 2010. In one embodiment, the controller 2010 is programmable logic controller, examples of which are described above. In one embodiment, the controller 2010 is a discrete hardware logic controller, having hardware logic for controlling various outputs of the safety system 2000. In a further embodiment, the controller 2010 includes a combination of programmable and discrete hardware logic.

In some embodiments, the controller 2010 includes an input 2012 from a user of the bagger system. For example, a foot pedal, lever, button, electronic input (e.g., from a touchscreen or computer) or the like may be used to signal the bagger system to begin the sealing process. In some embodiments (described in more detail below), safety system 2000 may require an input 2012 to be maintained during a portion of or the entirety of the sealing process. In some embodiments, the sealing process may be controlled by a timer or be otherwise automated, an no user input is required. In such cases the input 2012 may be an external input, such as a signal from external controller or from an additional component of the controller 2010.

In one embodiment, the exemplary safety device 2000 includes pressurized air source 2014, for example, a pump, compressor and/or pressurized tank, or the like. The pressurized air source is in fluid communication with an air valve 2016 via conduit 2018. The conduit 2018 may be a hose, pipe or the like. The air valve 2016 includes a input for fluid communication with air source 2014 via conduit 2018, an air release valve 2020, an electrical connection 2022 to the controller 2010, and one or more connections for additional conduits, such as conduits 2024 and 2026 for connection to one or more pneumatic chambers.

The safety system 2000 includes a light-emitting device 2030. The light-emitting device 2030 may include one or more light emitting diodes, or other light source that is collimated to form a focused beam of light 2034 that is projected out from the light-emitting device 2030. The safety system 2000 further includes a light-detecting device 2032. The light-detecting device 2032 may include a photoelectric detector, such as, a charge coupled device (CCD), a complementary metal oxide semiconductor (CMOS) sensor, or the like. The light-detecting device 2032 is in electrical contact with the controller 2010 via electrical connection 2036. The bagger system and safety system 2000 also includes a heating element 2070 for sealing bags, such as the heating element 70 described above.

In one exemplary embodiment, the safety system 2000 is configured to prevent the light detecting device 2032 from providing a "false safe" output (i.e. an output that incorrectly indicates a safe condition). A "false safe condition could occur under a variety of different circumstances. For example, light from another source could be detected by the light detecting device 2032. The other source of light can take a wide variety of different forms. For example, ambient light, such as natural sunlight and building interior lights, light from the light emitting device 2030 of another safety device 2000, light from a safety system of another type of machine, can other sources of light could be detected by the light detecting device.

The safety system 2000 can prevent the "false safe" output in a variety of different ways. For example, the light emitting device 2030 and the light detecting device 2032 can be paired such that the light emitting device 2030 emits light having a predetermined frequency or small range of predetermined frequencies and the light detecting device 2032 only provides an indication that the light has been received from the light emitting device 2030 when the received light has the same predetermined frequency or small range of frequencies that was emitted by the light emitting device 2030. In one exemplary embodiment, different safety-systems 2000 have different matched light frequencies to prevent the light emitted by the light emitting device 2030 of one safety system 2000 from being detected by the light detecting device 2032 of another safety system 2000 and potentially providing a "false safe."

In another exemplary embodiment, the safety system 2000 prevents a "false safe" output by limiting the field of view of the light detecting device 2032 and/or reducing the spread of the light emitted by the light emitting device 2030. The field of view of the light detecting device 2032 can be limited and the spread of light emitted by the light emitting device 2032 can be reduced in a variety of different ways. For example, a hollow tube can be placed in front of the light emitting device 2030 and/or the light detecting device 2032. A hollow tube in front of a light emitting device 2030 prevents the light from the light emitting device 2030 from spreading beyond the size of the opening of the hollow tube, until after the light exits the hollow tube. A hollow tube in front of a light detecting device 2032 only allows light that is substantially in line with the hollow tube to reach the light detecting device 2032. A hollow tube on the light emitting device 2030 and/or the light detecting device 2032 prevent light emitted from other sources and/or light emitted by the light emitting device 2030 of another safety system 2000 from being detected by the light detecting device 2032 and potentially providing a "false safe."

In another exemplary embodiment, the field of view of the light detecting device 2032 can be limited and the spread of light emitted by the light emitting device 2032 can be reduced by recessing the light emitting device 2030 and/or the light detecting device 2032 behind an aperture. The aperture in front of a light emitting device 2030 prevents the light from the light emitting device 2030 from spreading beyond the size of the aperture, until after the light exits the aperture. An aperture in front of a light detecting device 2032 only allows light that is substantially in line with the aperture to reach the light detecting device 2032. Recessing the light emitting device 2030 and/or the light detecting device 2032 behind an aperture prevent light emitted from other sources and/or light emitted by the light emitting device 2030 of another safety system 2000 from being detected by the light detecting device 2032 and potentially providing a "false safe."

In another exemplary embodiment, the field of view of the light detecting device 2032 can be limited and the spread of light emitted by the light emitting device 2032 can be reduced with a lens or lenses. A lens in front of a light emitting device 2030 can focus light from the light emitting device 2030. A lens in front of a light detecting device 2032 can be configured to only allow light that is substantially in line with the lens to reach the light detecting device 2032. Using a lens or lenses can prevent light emitted from other sources and/or light emitted by the light emitting device 2030 of another safety system 2000 from being detected by the light detecting device 2032 and potentially providing a "false safe."

In another exemplary embodiment, the safety system 2000 prevents a "false safe" output by providing one or more light shields or filters that prevent light (other than the light from the light emitting device) that can cause the light detecting device 2032 to provide a safe signal. The light shield or filter can be opaque, can be opaque to the frequencies of light that can cause the light detecting device to provide a safe signal, and/or can be polarized. The light shield or filter can be provided in the area of the reflector 2052 to block light that would be substantially in-line with the path from the reflector 2052 to the detector 2032 from reaching the detector 2032. A light shield or filter can prevent light emitted from other sources and/or light emitted by the light emitting device 2030 of another safety system 2000 from being detected by the light detecting device 2032 and potentially providing a "false safe."

The exemplary safety device 2000 further includes left and right pistons or arms, 2040 and 2042, respectively. The left and right pistons or arms 2040 and 2042 are slideably connected to left and right chambers 2044 and 2046, respectively. In one embodiment, the left and right pistons or arms 2040 and 2042 are both pistons and left and right chambers 2044 and 2046 are both pneumatic chambers. The pneumatic chambers 2044 and 2046 are in fluid communication with air valve 2016 via conduits 2024 and 2026, respectively.

In one embodiment, one of the left and right pistons or arms 2040 and 2042 may be a powered piston while the other is an unpowered, follower arm. Similarly, one of chambers 2044 and 2046 (corresponding to a respective piston) may be a pneumatic chamber, while the other is not pressurized and merely slides in and out of its respective chamber. In another embodiment (described further below) left and right pistons or arms 2040 and 2042 are unpowered, follower arms, neither chamber 2044 nor 2046 is a pneumatic chamber, and instead there is a separate pneumatic chamber and piston.

In further embodiments, one or both of the left and right pistons or arms 2040 and 2042 may be a powered piston that is powered by one or more electric motors (not shown). The electric motor(s) may be controlled by the controller 2010 and may be servomotors, stepper motors, or any other suitable motor. In one embodiment, one or both of the left and right pistons or arms 2040 and 2042 are powered both by a motor and by pneumatics. In one embodiment, one of the left and right pistons or arms 2040 and 2042 is powered by a motor and the other is powered by pneumatics. In a further embodiment, neither of the left and right pistons or arms 2040 and 2042 are powered and there is a separate piston that is powered by a motor and/or pneumatics.

The ends of the left and right pistons or arms 2040 and 2042 opposite the chambers 2044 and 2046 are connected to a seal backing bar 2068, such as the backing bar 68 described above. The seal backing bar 2068 includes a pair of light reflectors, 2050 and 2052. The light reflectors, 2050 and 2052 may be mirrors, may be made of metal or glass or other reflective materials, or a combination of those materials and/or any other materials that would provide for a reflective surface. The seal backing bar 2068 also includes a rubber (or other resilient material) seal backing element 2168, such as rubber seal backing element 1168 described earlier. The seal backing element 2168 is connected to the seal backing bar 2068 by one or more force generating members, such as force generating members 2054 and 2056, which maintain a space between the seal backing bar 2068 and the rubber seal backing element 2168. The force generating members may be springs and preferably have a low compression force so that they may be easily compressed to move the rubber seal backing element 2168 toward the seal backing bar 2068.

In one embodiment, one or both of the chambers 2044 and 2046 may include an internal force generating member (not shown), for example a spring, that provides a compressive force to the respective pistons or arms 2040 and 2042 that is counter to an pneumatic force exerted on the pistons or arms 2040 and 2042. Accordingly, when the bagger system and safety system 2000 are not active (i.e., there is no pneumatic force) the force generating member(s) push the sealing back bar 2068 away from the heating element 2070.

In one embodiment, one or both of the chambers 2044 and 2046 may include both forward and rearward pneumatic connections such that air pressure could be added to one side of the chamber while being removed from the other side of the chamber to move a respective piston to a desired location with respect to the chamber. Accordingly, in this embodiment, no additional force generating member is necessary within the either chambers 2044 or 2046, as the controller (through use of a plurality of valves not shown) would be able to control pneumatic pressure in order to determine whether and to what extent the pistons or arms 2040 and 2042 are extended from or retracted into their respective chambers 2044 and 2046.

Figure 18A:
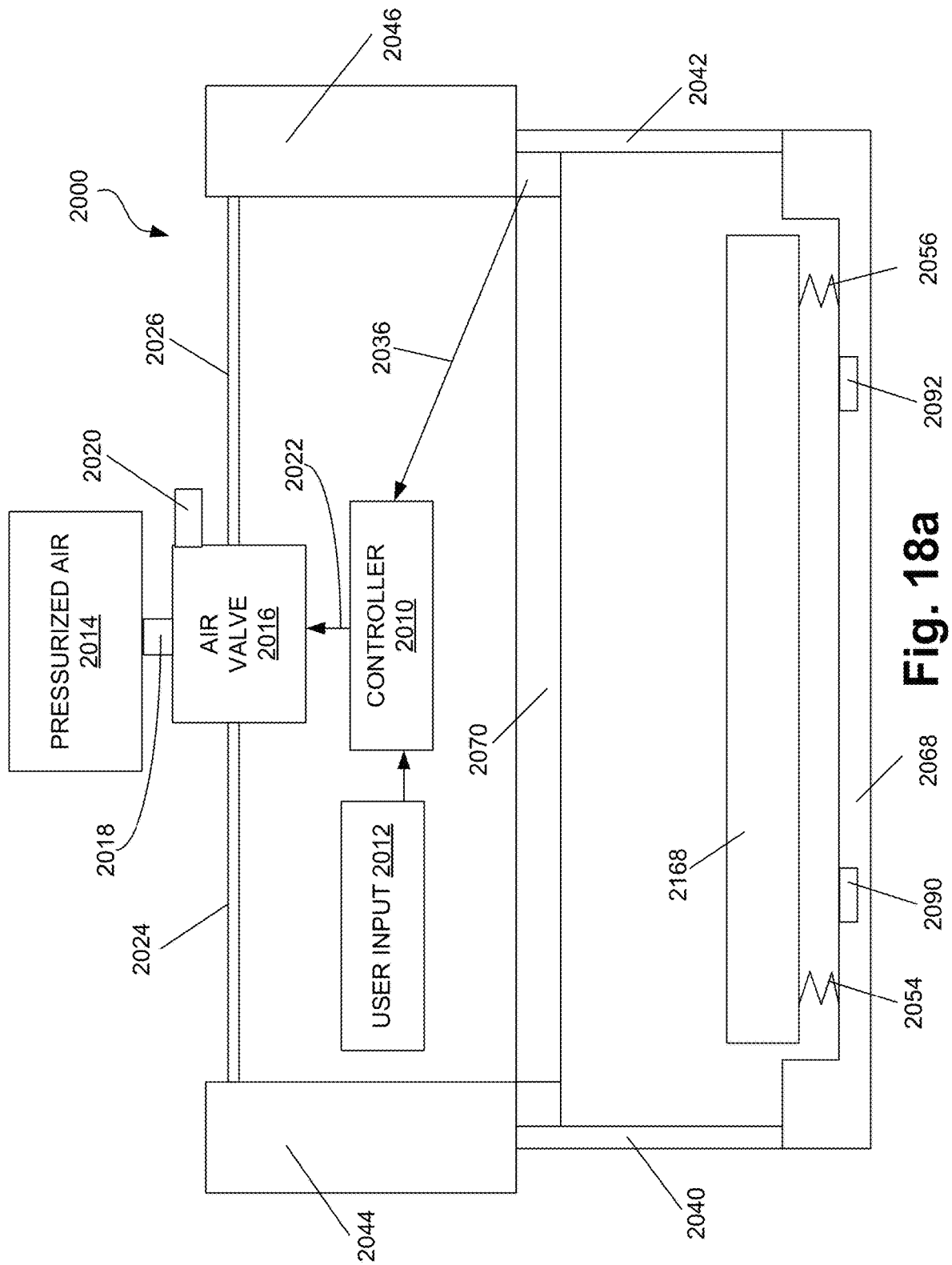
FIG. 18a is a schematic diagram of an alternate embodiment of the first exemplary safety system shown prior to starting a sealing process.

In one embodiment, as illustrated in FIG. 18*a*, the safety system 2000 utilizes proximity sensors 2090 and 2092 in order to detect the distance between the seal backing bar 2068 and rubber seal backing element 2168. Proximity sensors 2090 and 2092 may be used instead of or in addition to the light beam detection mechanisms described above. While FIG. 18*a* depicts two sensors 2090 and 2092, it is envisioned that any number of sensors could be used (and in any suitable arrangement) to achieve the same function.

In one embodiment, the sensors are physical sensors, e.g., bump switches, that extend out from the seal backing bar 2068, and which are triggered when the rubber seal backing element 2168 moves a sufficient distance toward the seal backing bar 2068 to contact either or both of the switches 2090 or 2092. In one embodiment, the proximity switches 2090 and 2092 are non-physical switches, for example infrared proximity sensors or inductive proximity sensors that may sense a corresponding metallic member on or in the rubber seal backing element 2168. If the proximity switches 2090 or 2092 detect that the rubber seal backing element 2168 has moved sufficiently close to the seal backing bar 2068, then the proximity switches 2090 or 2092 may send an electrical signal to the controller 2010 to control movement of the seal backing bar 2068 as described herein with reference to other embodiments using a light beam detection mechanism.

Figure 19:
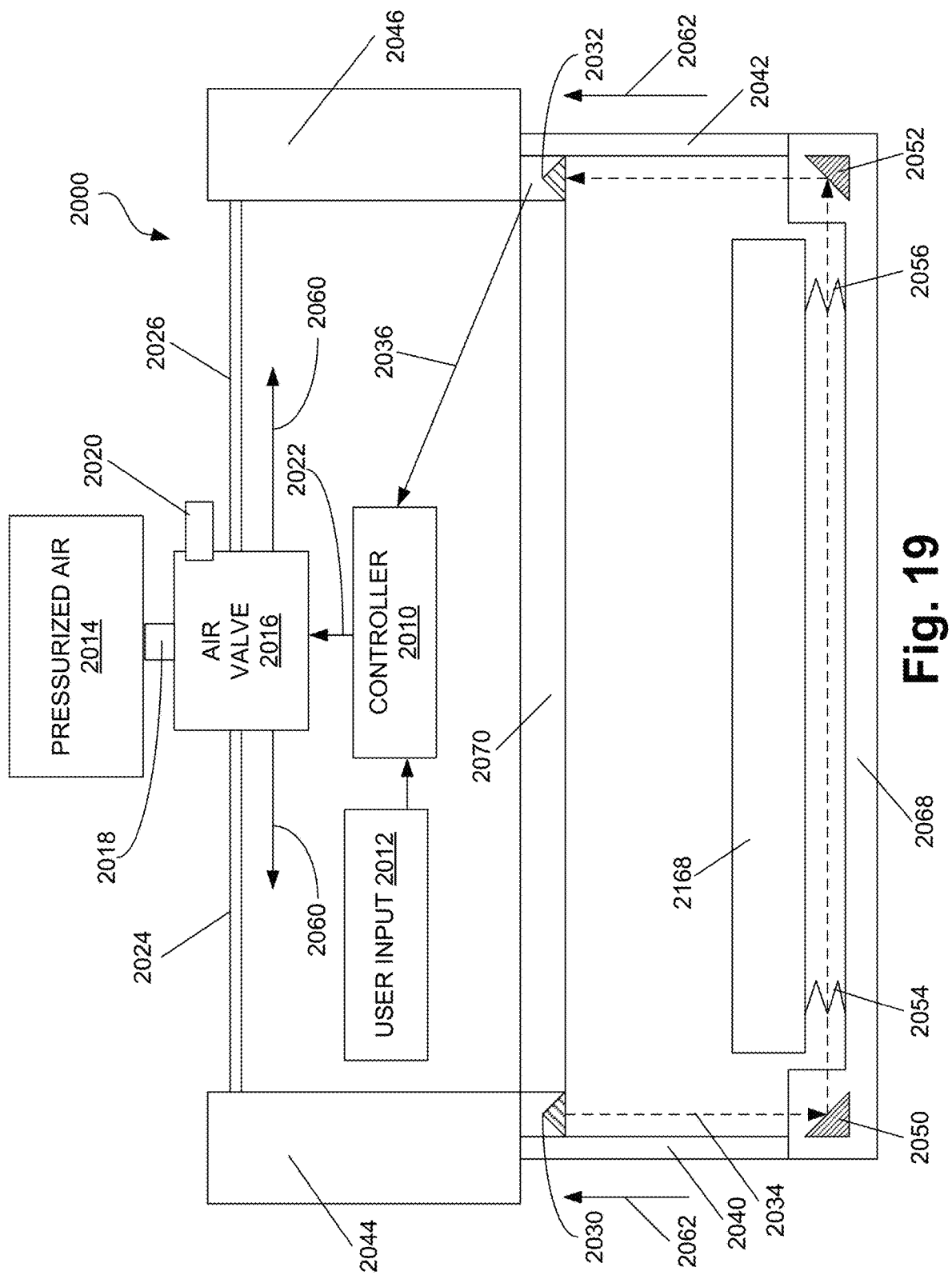
FIG. 19 is a schematic diagram of the first exemplary safety system shown at a first time after starting the sealing process.

FIG. 19 illustrates the safety system 2000 in operation. Operation begins when the controller 2010 receives a user (or automated) input 2012 to seal a bag. The controller 2010 then controls the valve 2016 such that pressurized gas flows from the valve 2016 to chambers 2044 and 2046 via conduits 2024 and 2026 in the direction shown by arrows 2060. (In other embodiments, as described above, the controller may cause pressurized gas to flow to only one chamber or to a third chamber not shown.) The chambers 2044, 2046 can include internal conduits or passages to direct the pressurized gas to an appropriate side of the piston(s) 2040 and/or 2042. The pressurized gas exerts a force on the left and right pistons 2040 and 2042 counter to the internal force generating members (not shown) of the chambers 2044 and 2046, which causes the left and right pistons 2040 and 2042 to retract into their respective chambers 2044 and 2046. This movement pulls the attached seal backing bar 2068 (which includes reflectors 2050 and 2052, rubber seal backing element 2168, and force generating members 2054 and 2056) toward the heating element 2070, in the direction shown by the arrows 2062.

At this point, if there is no obstruction in the area of the safety system, an uninterrupted beam of light 2034 will be emitted from the light-emitting device 2030, reflect off light reflector 2050, pass behind the rubber seal backing element 2168, reflect off light reflector 2052, and be received by light-detecting device 2032. The light-detecting device 2032 will in turn signal, via electrical connection 2036, the controller 2010 that it has received the uninterrupted light beam 2034, signifying that no obstructions have been detected and that the controller may continue with the sealing process by moving the seal backing bar 2068 (which includes reflectors 2050 and 2052, rubber seal backing element 2168, and force generating members 2054 and 2056) toward the heating element 2070, in the direction shown by the arrows 2062.

Figure 20:
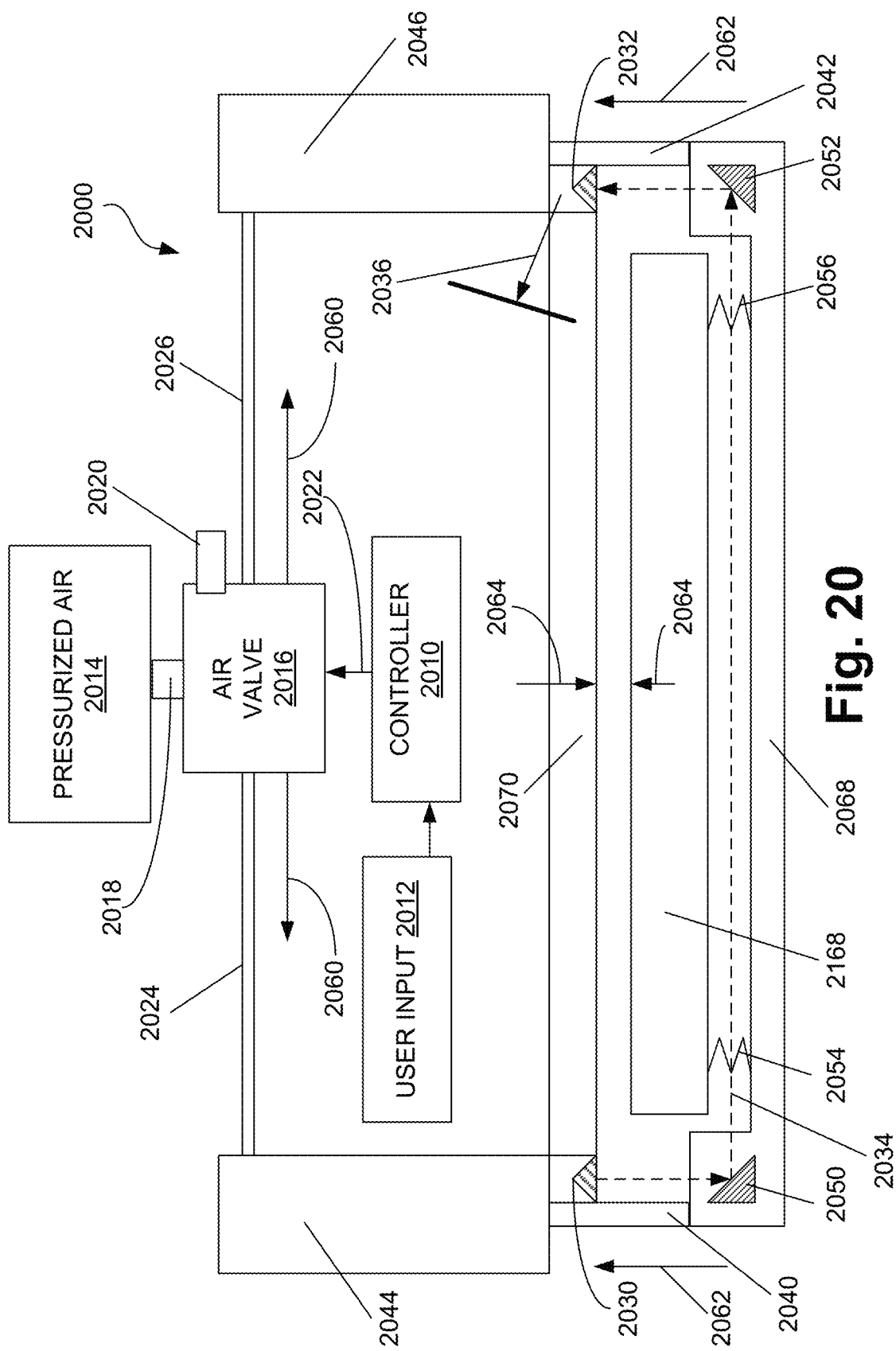
FIG. 20 is a schematic diagram of the first exemplary safety system shown at a second time after starting the sealing process.

Once the seal backing bar 2068 has moved into a position close enough to the heating element 2070 (as depicted in FIG. 20), the safety system will be disengaged such that the plies of a bag being sealed (not shown) will not trigger the safety system 2000. The distance at which the safety system 2000 is disengaged is denoted by the arrows 2064. This distance may be, for example, the similar to the width or size of a small human finger and comport with distances in any known safety standards for such devices. In one embodiment, the controller 2010 may detect that the seal backing bar 2068 has moved a sufficient distance (either by a measurement of air pressure or via electro or mechanical sensors) and may subsequently ignore the input of any signal received from the light-detecting device 2032 via connection 2036. In one embodiment, the light-detecting device 2032 may detect (or receive an input signaling that) that the seal backing bar 2068 has moved a sufficient distance and enter a configuration wherein it will continue to transmit to the controller 2010 via connection 2036 that there are no obstructions (and that it should proceed with sealing) regardless of whether the light-detecting device 2032 actually detects the light beam 2034. Once the seal backing bar 2068 has returned to a sufficient distance from the heating element 2070, the light-detecting device 2032 would return to normal operation.

Figure 21:
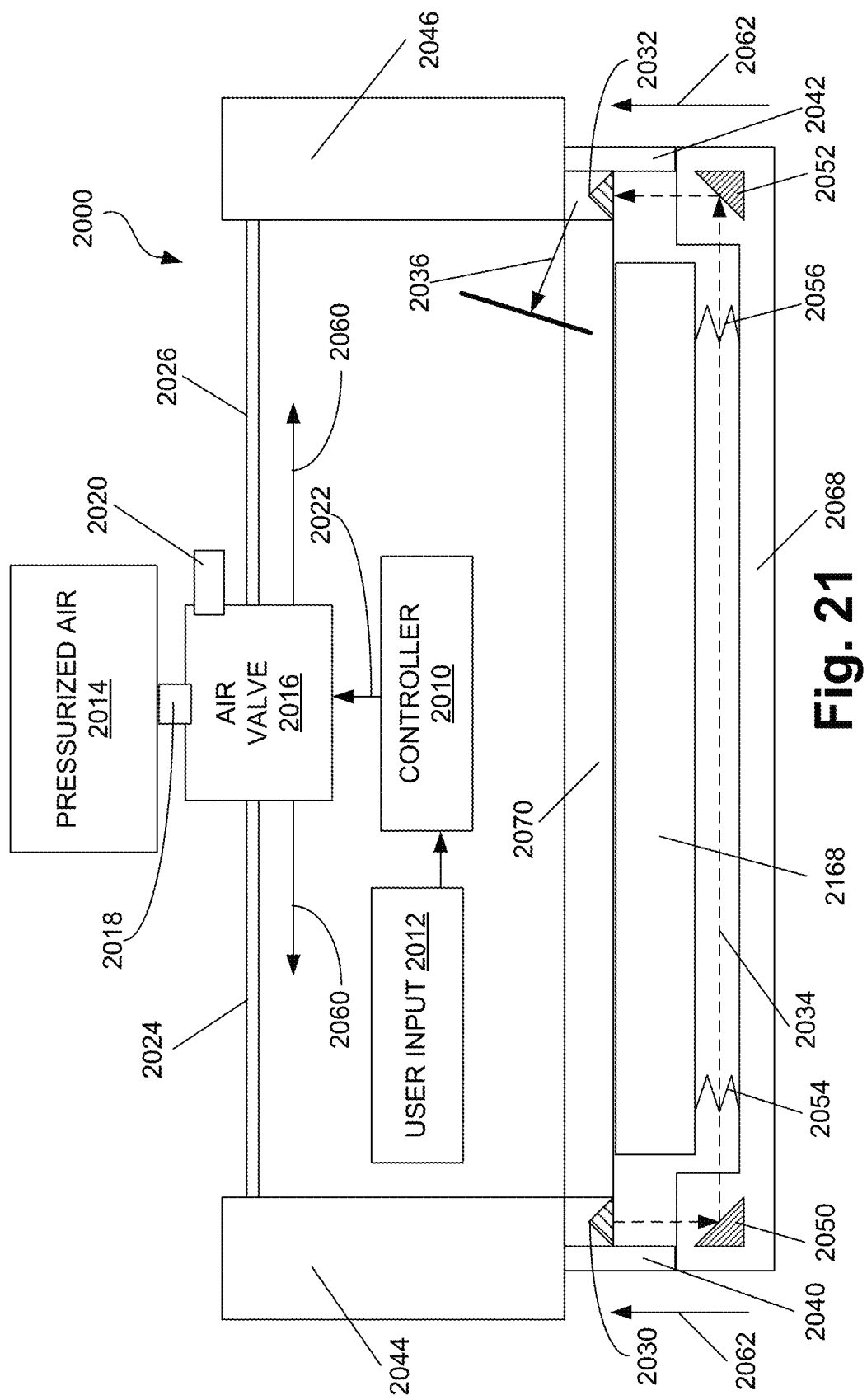
FIG. 21 is a schematic diagram of the first exemplary safety system shown at a third time after starting the sealing process.
Figure 22:
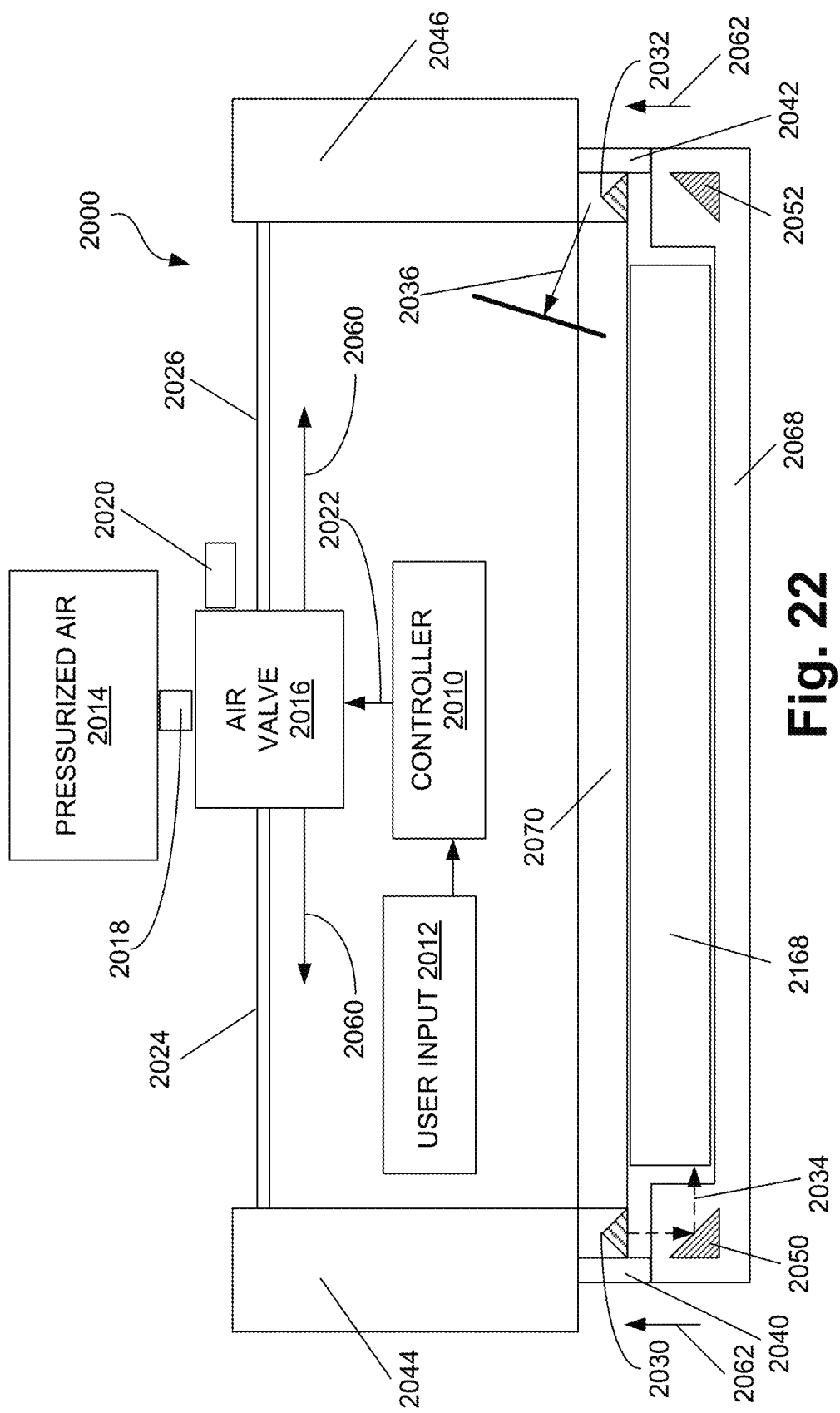
FIG. 22 is a schematic diagram of the first exemplary safety system shown at a fourth time after starting the sealing process.

FIGS. 21 and 22 depict the safety system 2000 as a bag (not shown) is being sealed. The seal backing bar 2068 continues to move in the direction of arrows 2062 until the rubber seal backing element 2168 abuts the heating element 2070. In some embodiments, as described above, the heating element 2070 may be maintained at sufficient sealing temperature and in some embodiments, the controller 2010 may instruct the heating element 2070 to begin heating once the rubber seal backing element 2168 abuts the heating element 2070. At this point (shown in FIG. 21), as described immediately above, the safety system 2000 remains disengaged even though the light beam 2034 continues to be received by the light-detecting device 2032 because the distance between the rubber seal backing element, 2168 and the heating element 2070 is sufficiently small (effectively zero.)

As shown in FIG. 22, as the seal backing bar 2068 continues to move in the direction of arrows 2062, the mechanical force generators 2054 and 2056 will compress, applying a further pressure between the rubber seal backing element 2168 and heating element 2070 to complete the seal of the bag plies contained therebetween (not shown). Compression of the mechanical force generators 2054 and 2056 causes the rubber seal backing element 2168 to move toward the seal backing bar 2068, thus interrupting the light beam 2034. As described above, however, this interaction will not stop the sealing process, as the safety system 2000 has been disengaged due to the small distance between the rubber seal backing element 2168 and the heating element 2070.

Once the sealing process is complete (e.g., after a certain time has passed and/or a certain temperature of the heating element 2070 achieved), the controller 2010 may control the valve 2016 to release the pressurized gas in the system via release valve 2020. Once the system is depressurized, any pneumatic force on the left and right pistons 2040 and 2042 will cease and the force of the force generating members of chambers 2044 and 2042 will cause the left and right pistons 2040 and 2042 to move back out of their respective chambers 2044 and 2042, thus causing the attached seal backing bar 2068 (which includes reflectors 2050 and 2052, rubber seal backing element 2168, and force generating members 2054 and 2056) to move back away from the heating element 2070. In some embodiments, the system may also be depressurized (i.e., the sealing process canceled) manually if a user ceases providing a user input (e.g., the user steps off of foot pedal).

Figure 23:
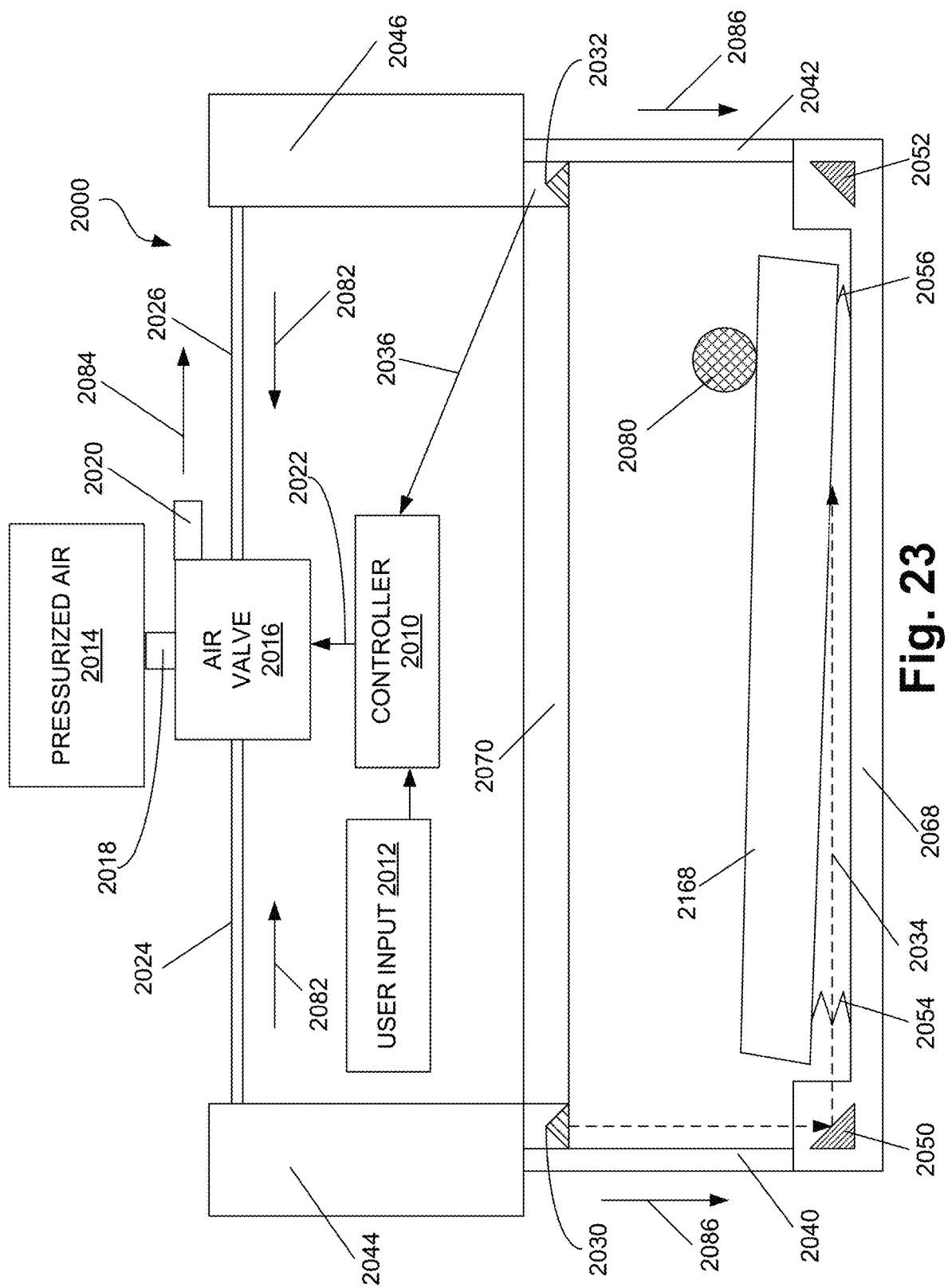
FIG. 23 is a schematic diagram of the first exemplary safety system shown at a first time after starting the sealing process with a seal bar tilted due to engagement with an obstruction.

FIG. 23 illustrates a scenario when an obstruction 2080 is introduced into the safety system 2000 during the sealing process. The obstruction 2080 may be a human appendage or article of clothing, or any other object. Just before the obstruction 2080 is introduced into the system, the bagger may be in the process of sealing as depicted in FIG. 19, with the seal backing bar 2068 (which includes reflectors 2050 and 2052, rubber seal backing element 2168, and force generating members 2054 and 2056) moving toward the heating element 2070, in the direction shown by the arrows 2062 of that figure. Turning back to FIG. 23, the obstruction 2080 provides a counter force against the rubber seal backing element 2168, which in turn causes compression of one or both of the force generating members 2054 and 2056. The compression allows the rubber seal backing element 2168 to move toward the seal backing bar 2068, thus interrupting the light beam 2034.

When the light-detecting device 2032 no longer receives the light beam 2034 due to the interruption of the light beam 2034, the light-detecting device 2032 sends a signal to controller 2010 (or an existing signal to the controller 2010 is broken), signifying that bag-sealing process should immediately stop. As a result of this signal, the controller causes the valve 2016 to release the pressurized gas in the system via release valve 2020, which cause the gas to flow out from the left and right chambers 2044 and 2042, via conduits 2024 and 2026 in the direction of arrows 2082. The gas then flows out from the system as show by arrow 2084.

Once the system is depressurized, any pneumatic force on the left and right pistons 2040 and 2042 will cease and the force of the force generating members of chambers 2044 and 2042 will cause the left and right pistons 2040 and 2042 to move back out of their respective chambers 2044 and 2042, thus causing the attached seal backing bar 2068 (which includes reflectors 2050 and 2052, rubber seal backing element 2168, and force generating members 2054 and 2056) to move back away from the heating element 2070, in the direction shown by the arrows 2086.

In one embodiment, if the safety system 2000 has detected an obstruction, stopped the sealing process, and retracted the seal backing bar 2068 as described above, the safety system 2000 enters a fault state wherein further sealing action is ceased until a user provides an affirmative input to commence the sealing process. A user can provide such input, for example, via the user input 2012 as described above.

Figure 24:
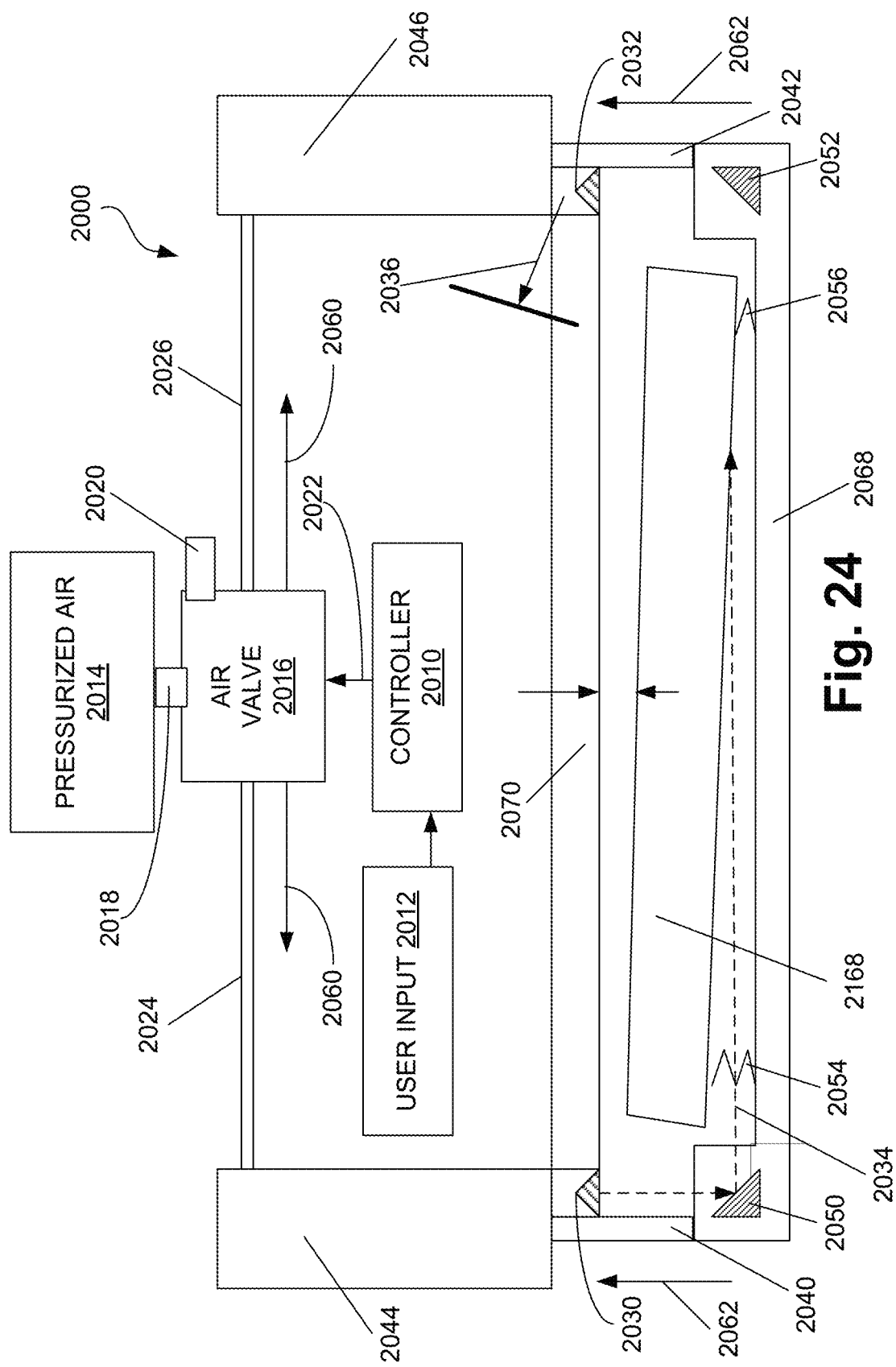
FIG. 24 is a schematic diagram of the first exemplary safety system shown at a second time after starting the sealing process with a seal bar tilted due to engagement with an obstruction.
Figure 25:
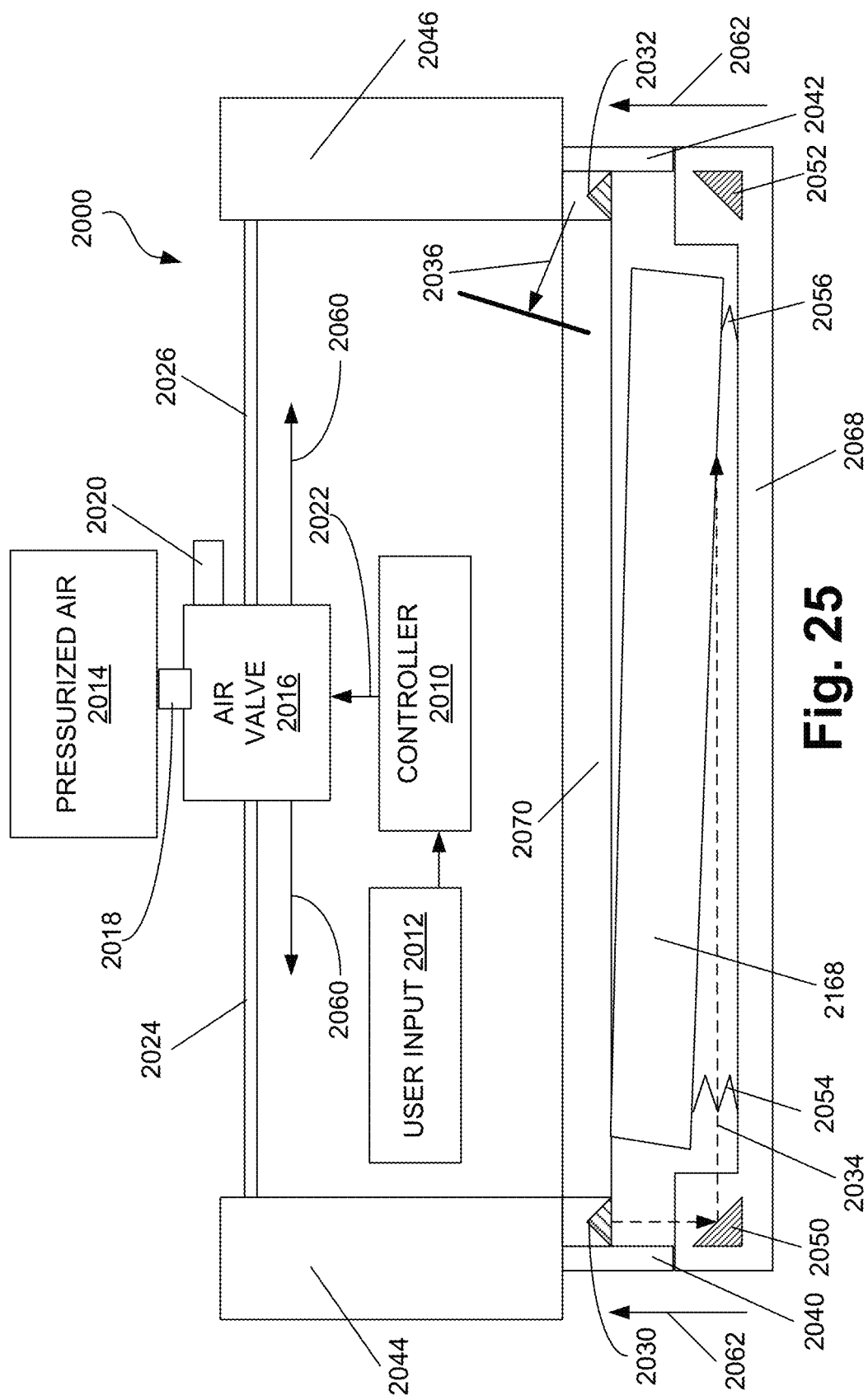
FIG. 25 is a schematic diagram of the first exemplary safety system shown at a third time after starting the sealing process with a seal bar tilted due to engagement with an obstruction.
Figure 26:
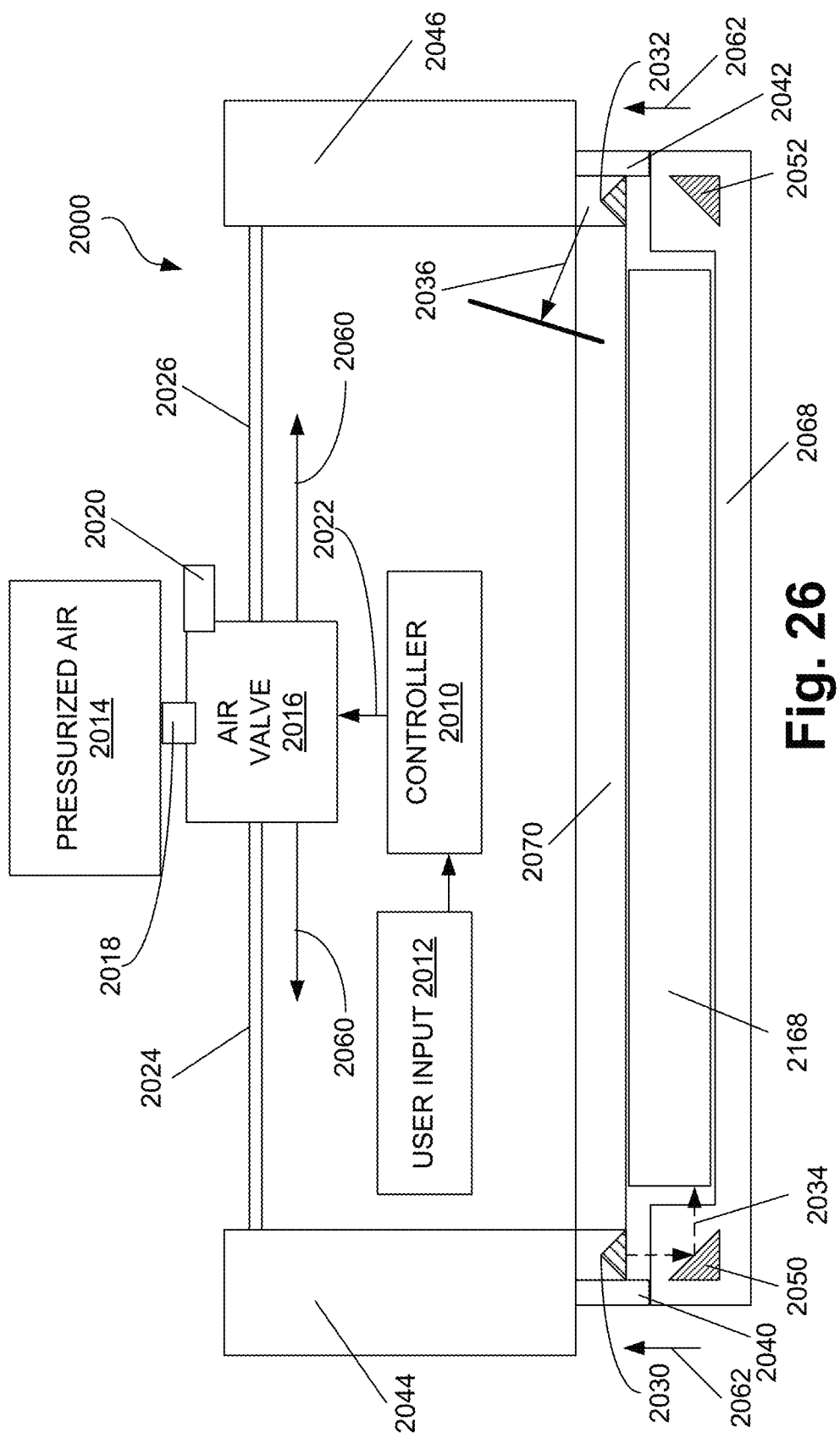
FIG. 26 is a schematic diagram of the first exemplary safety system shown at a fourth time after to starting the sealing process when an obstruction has been introduced.
Figure 27:
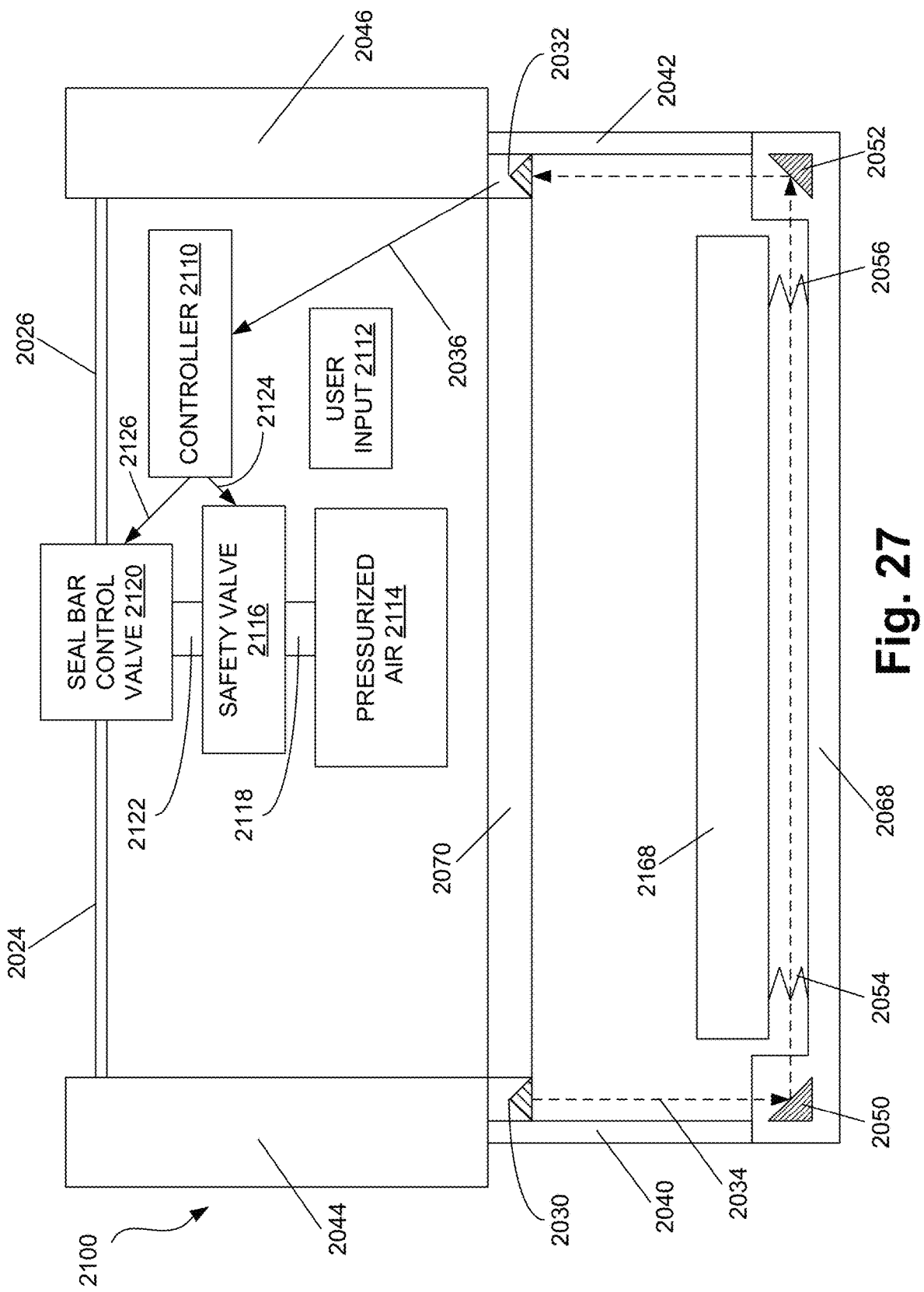
FIG. 27 is a schematic diagram of a second exemplary safety system shown prior to starting a sealing process.

FIGS. 24-26 illustrate a scenario in which the rubber seal backing element 2168 moves back against the seal backing bar 2068, but only after the distance between the rubber seal backing element 2168 and heating element 2070 (denoted by the arrows 2064) is small enough that a system stop is not warranted. That is, the distance is such that the tilting of the rubber seal backing element 2168 is due to normal sealing operation rather than an obstruction. The seal backing bar 2068 can be moved for a variety of different reasons during the sealing operation. For example, the weight of a loaded bag may pull the material of the bag against the seal backing bar 2068. This puling of the material can be to one side of the other on the seal backing bar 2068 if the load in the bag is offset to one side or the other.

In this embodiment, even though the movement of the light beam 2034 is broken by some force exerted against the rubber seal backing element 2168 (see FIG. 24), the sealing process will continue because, as described above, the electrical connection 2036 between the light-detecting device 2032 and the controller is broken or is being ignored due to the sufficiently small distance denoted by arrows 2064. Thus, the seal backing bar 2068 and rubber seal backing element 2168 will continue to move toward the heating element 2070 (see FIG. 25), until eventually, the rubber seal backing element 2168 fully abuts the heating element 2070 (see FIG. 26) and a seal is formed.

FIGS. 27-35 illustrate another exemplary embodiment of a bagger safety system 2100. That uses an additional valve that may lessen wear on some system components. Most of the components and functions of the exemplary bagger safety system 2100 are the same as those described above for exemplary bagger safety system 2000 and will not be repeated herein. Like reference numerals are used in FIGS. 27-35 where the components of exemplary bagger safety system 2100 are substantially the same as those described above for safety system 2000.

The safety system 2100 includes a controller 2110 similar to the described above, which may be any suitable controller, such as described above. In some embodiments, the controller 2110 includes an input 2112 from a user of the bagger system, such as described above. The exemplary safety device 2100 also includes pressurized air source 2114, such as described above. The pressurized air source 2114 is in fluid communication with a safety valve 2116 via conduit 2118, which maybe any suitable conduit as described above. The safety valve 2116 is in turn in fluid communication with a seal bar control valve 2120 via conduit 2122. The controller 2110 includes electrical connections to both safety valve 2116 and the seal bar control valve 2120, connections 2124 and 2126, respectively.

Figure 28:
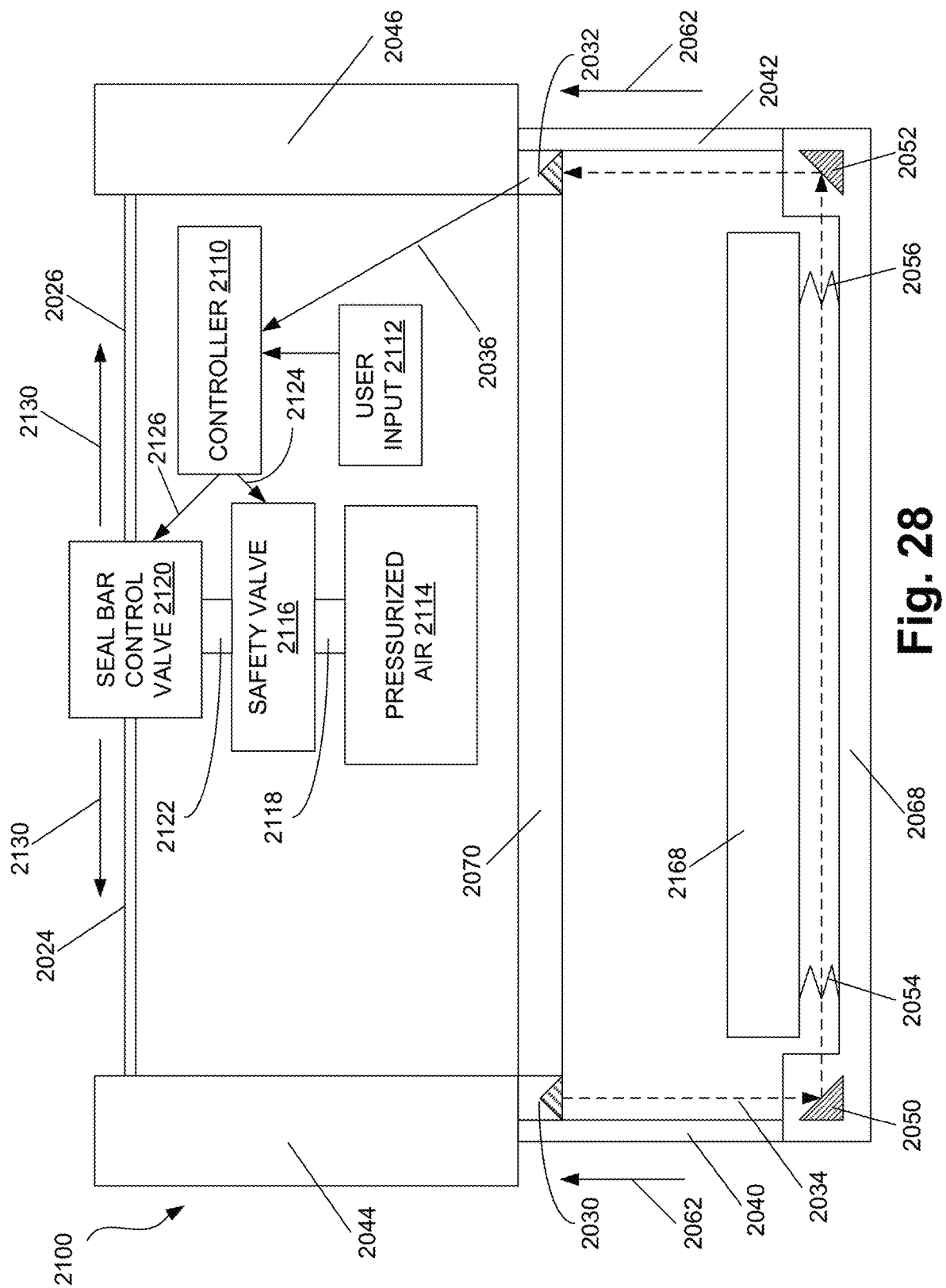
FIG. 28 is a schematic diagram of the second exemplary safety system shown at a first time after starting the sealing process.
Figure 29:
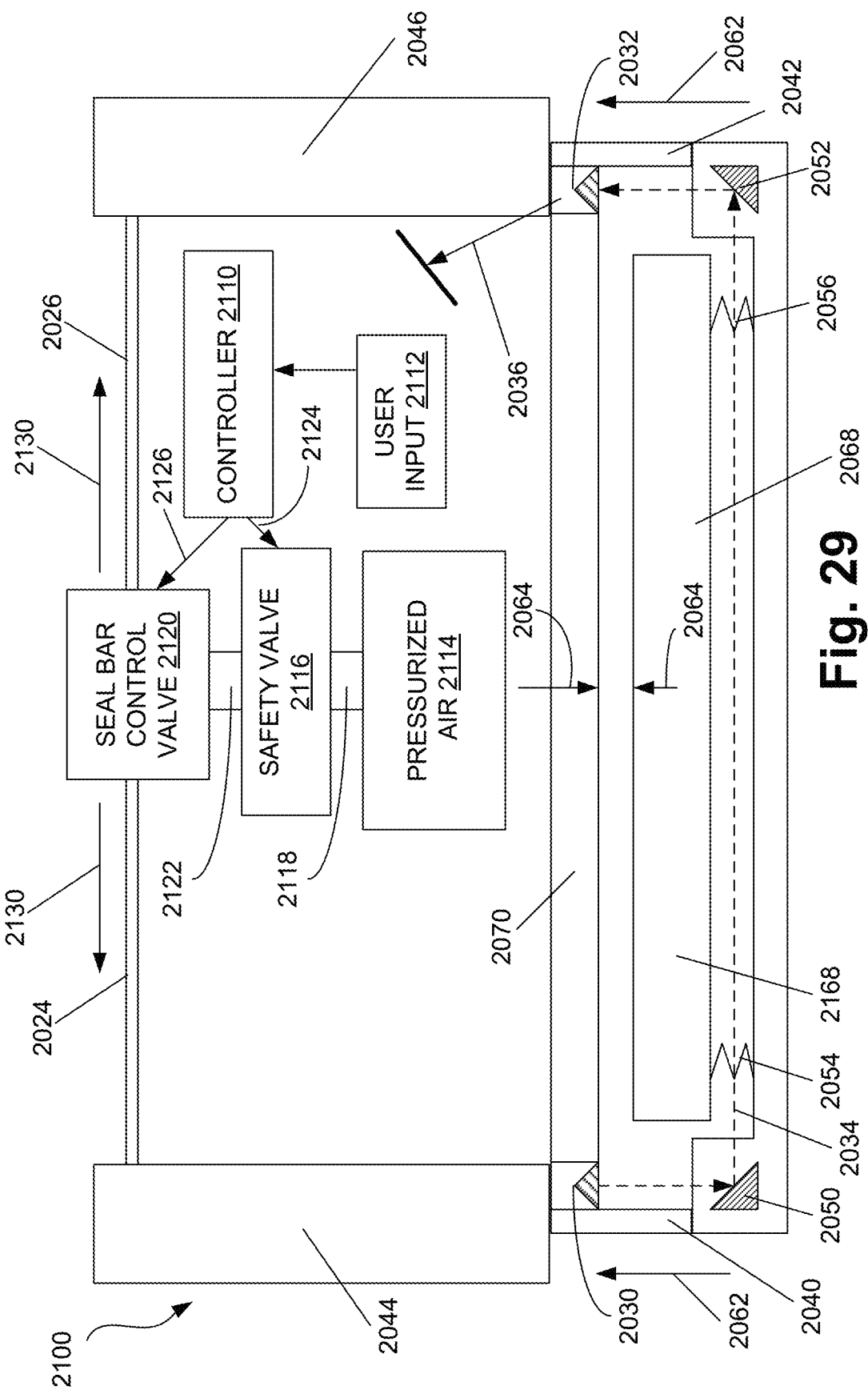
FIG. 29 is a schematic diagram of the second exemplary safety system shown at a second time after starting the sealing process.
Figure 30:
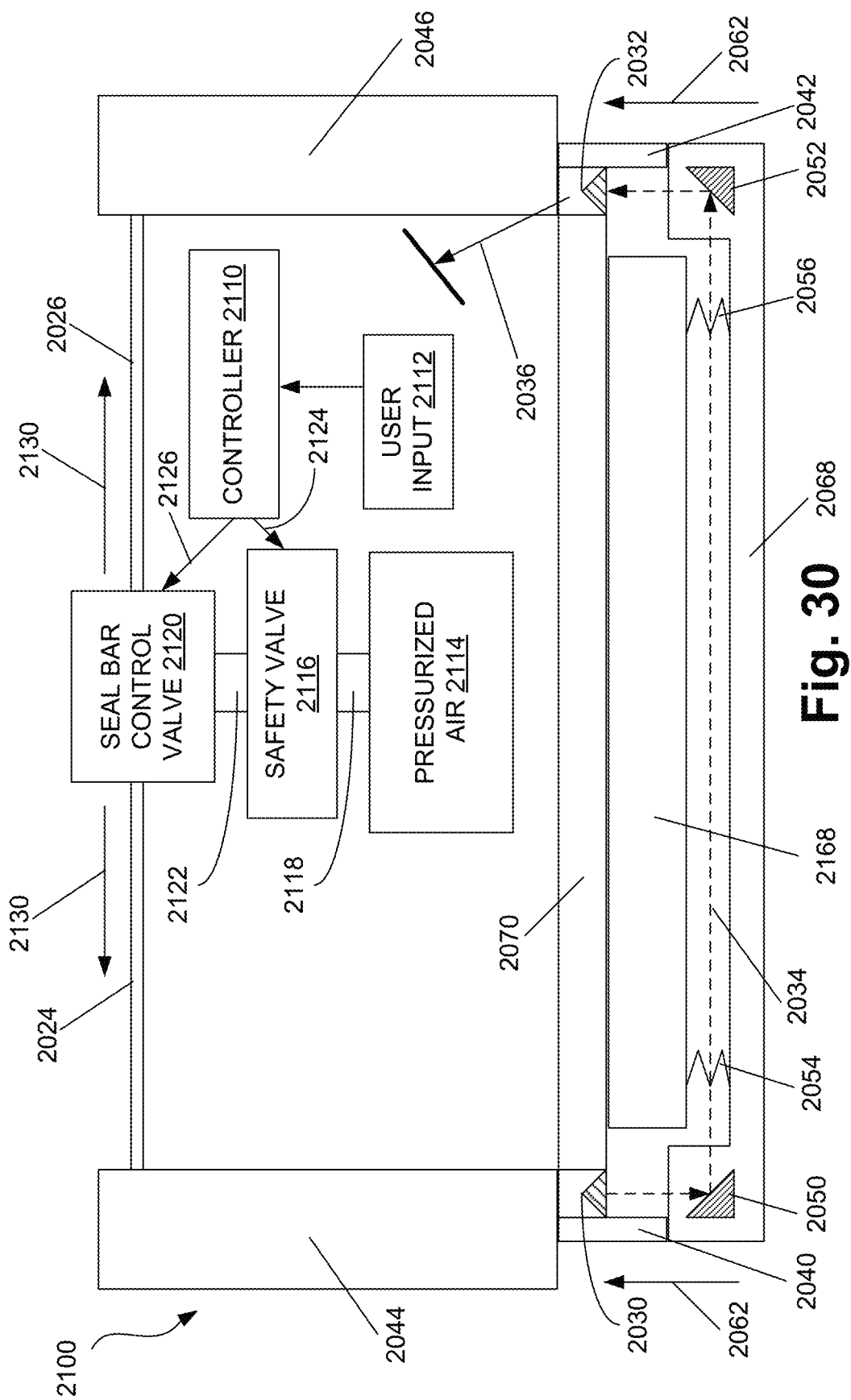
FIG. 30 is a schematic diagram of the second exemplary safety system shown at a third time after starting the sealing process.
Figure 31:
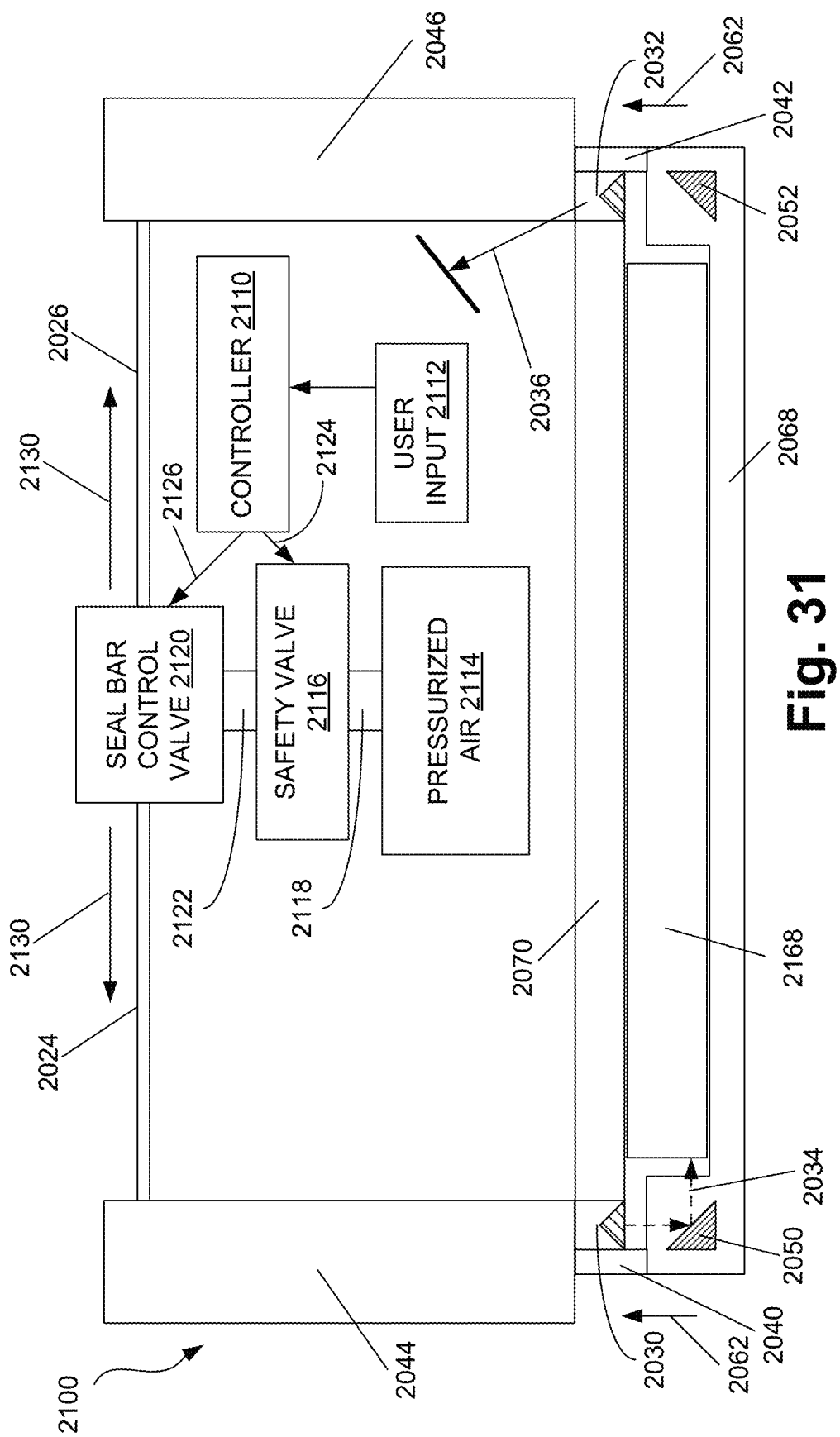
FIG. 31 is a schematic diagram of the second exemplary safety system shown at a fourth time after starting the sealing process.

During operation of the safety system 2100, the controller 2110 can control movement of the seal backing bar 2068 by sending a signal via connection 2124 to the seal bar control valve 2120 to release pressurized air into one or both of the left or right chambers 2044 and 2042 in the direction of the arrows 2130 as shown in FIG. 28. As mentioned above, the chamber(s) 2042 and/or 2044 can include internal conduits to route pressurized air (or fluid) to an appropriate side of a head of the piston(s) 2040 and/or 2042. The sealing operation of the embodiment illustrated in FIGS. 27-31 is substantially the same as the embodiment illustrated in FIGS. 19-22 and is therefore not described again in detail here.

Figure 32:
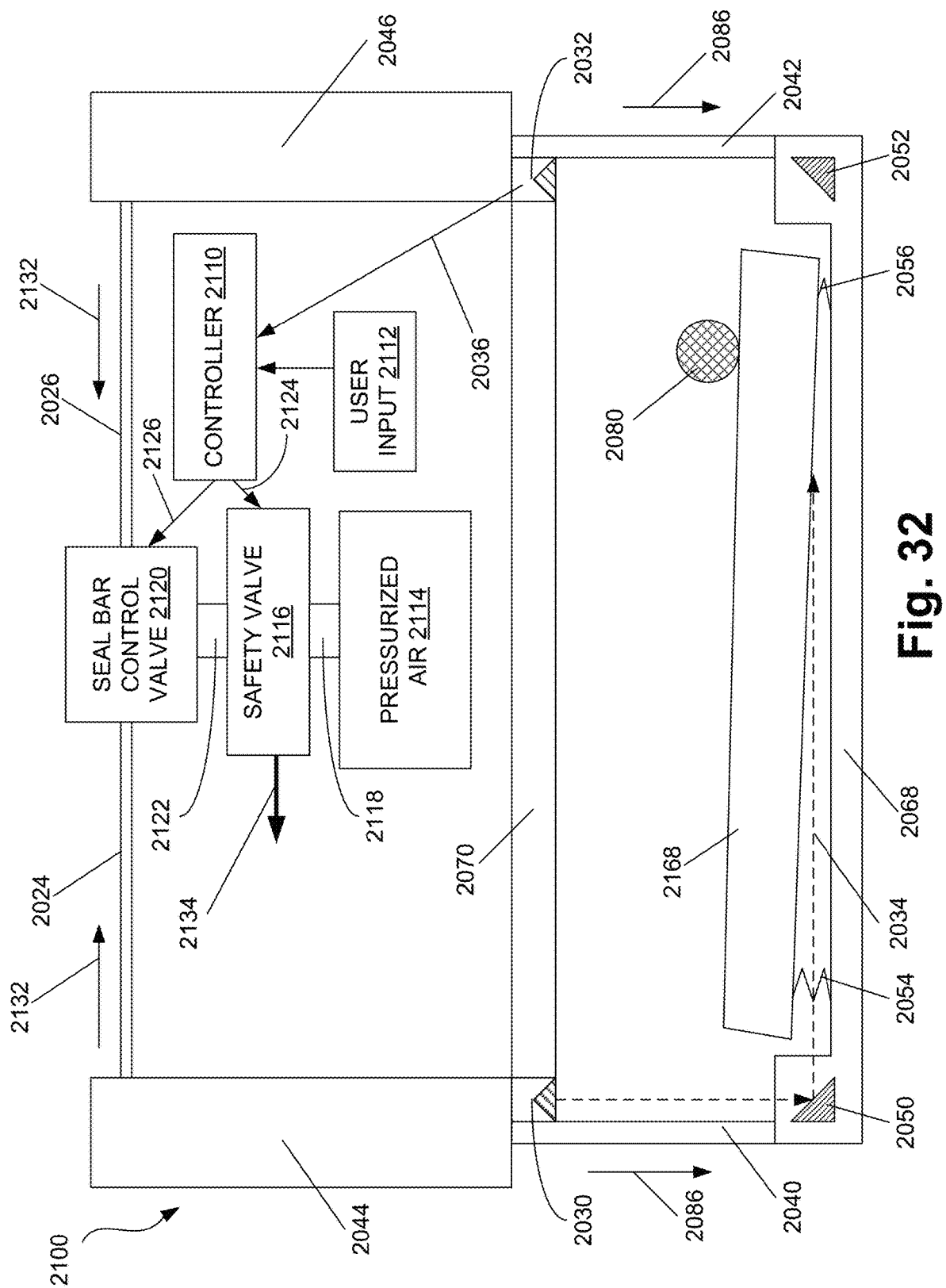
FIG. 32 is a schematic diagram of the second exemplary safety system shown at a first time after starting the sealing process with a seal bar tilted due to engagement with an obstruction.

As depicted in FIG. 32, the an obstruction 2080 is introduced into the safety system 2100, the obstruction 2080 may provide a counter force against the rubber seal backing element 2168, which in turn causes compression of one or both of the force generating members 2054 and 2056. The compression allows the rubber seal backing element 2168 to move toward the seal backing bar 2068, thus interrupting the light beam 2034.

When the light-detecting device 2032 no longer receives the light beam 2034 due to the interruption of the light beam 2034, the light-detecting device 2032 sends a signal, via electrical connection 2036, to controller 2110 (or an existing signal to the controller 2110 is broken), signifying that bag-sealing process should immediately stop. As a result of this signal, the controller 2110 causes the safety valve 2116 to release the pressurized gas in the system, which will cause gas to flow out of the left and right chambers 2044 and 2046 via conduits 2024 and 2026 in the direction of arrows 2132. The gas will then flow through the seal bar control valve 2120, through conduit 2122, and the vent via safety valve 2116 as depicted by the arrow 2134.

Once the system is depressurized, any pneumatic force on the left and right pistons 2040 and 2042 will cease and the force of the force generating members of chambers 2044 and 2042 will cause the left and right pistons 2040 and 2042 to move back out of their respective chambers 2044 and 2042, thus causing the attached seal backing bar 2068 (which includes reflectors 2050 and 2052, rubber seal backing element 2168, and force generating members 2054 and 2056) to move back away from the heating element 2070, in the direction shown by the arrows 2086.

Figure 33:
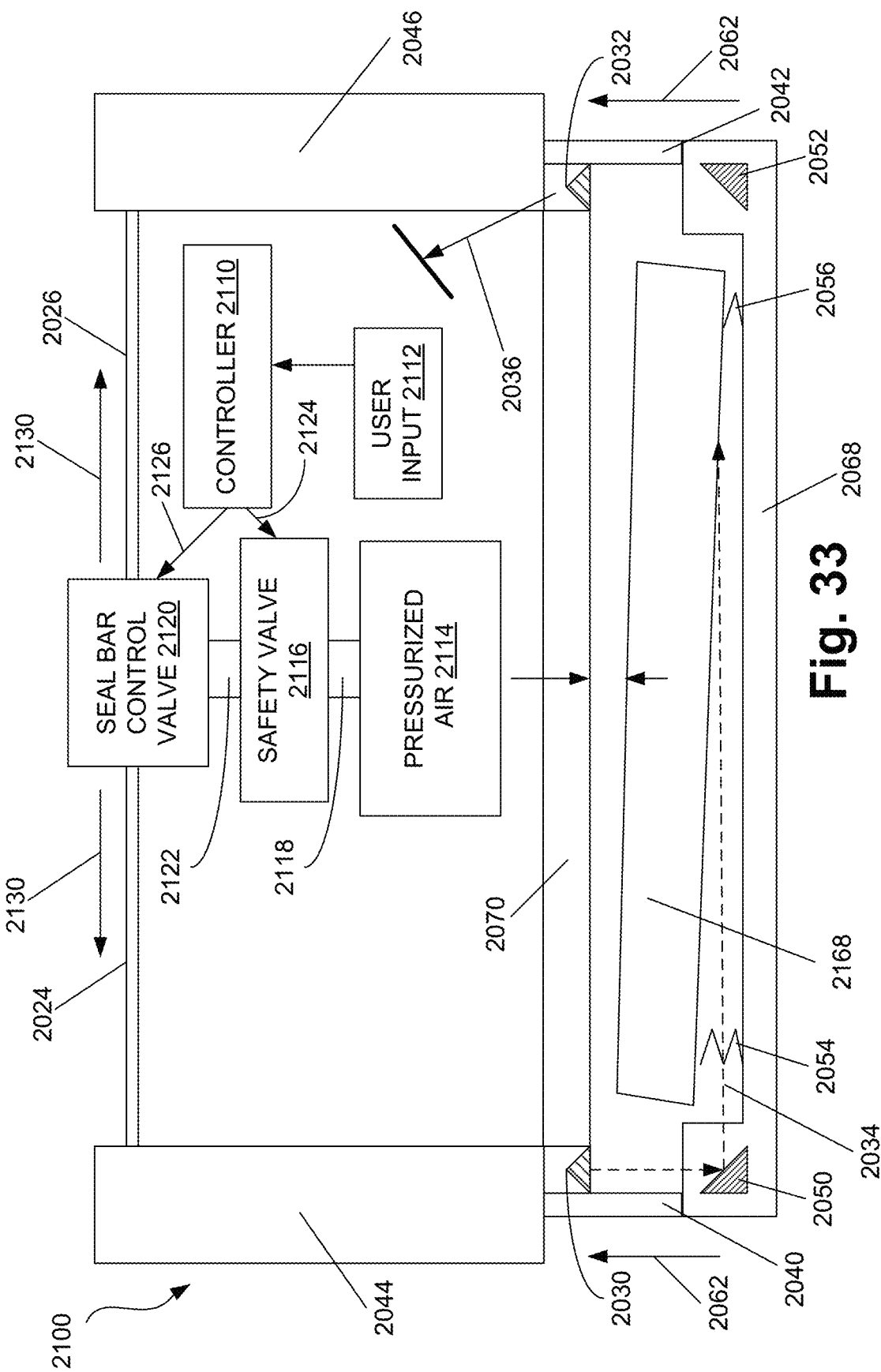
FIG. 33 is a schematic diagram of the second exemplary safety system shown at a second time after starting the sealing process with a seal bar tilted due to engagement with an obstruction.
Figure 34:
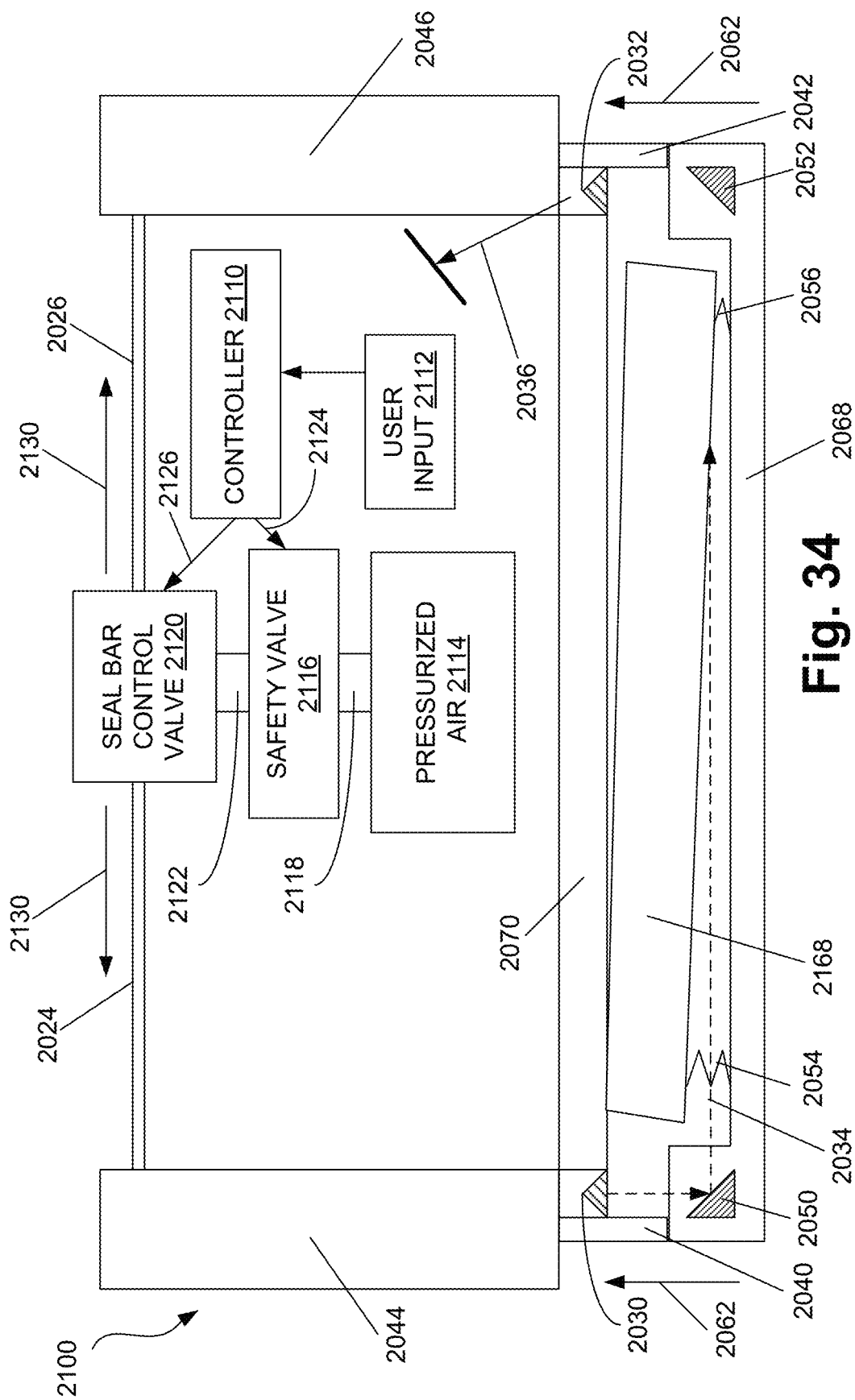
FIG. 34 is a schematic diagram of the second exemplary safety system shown at a third time after starting the sealing process with a seal bar tilted due to engagement with an obstruction.
Figure 35:
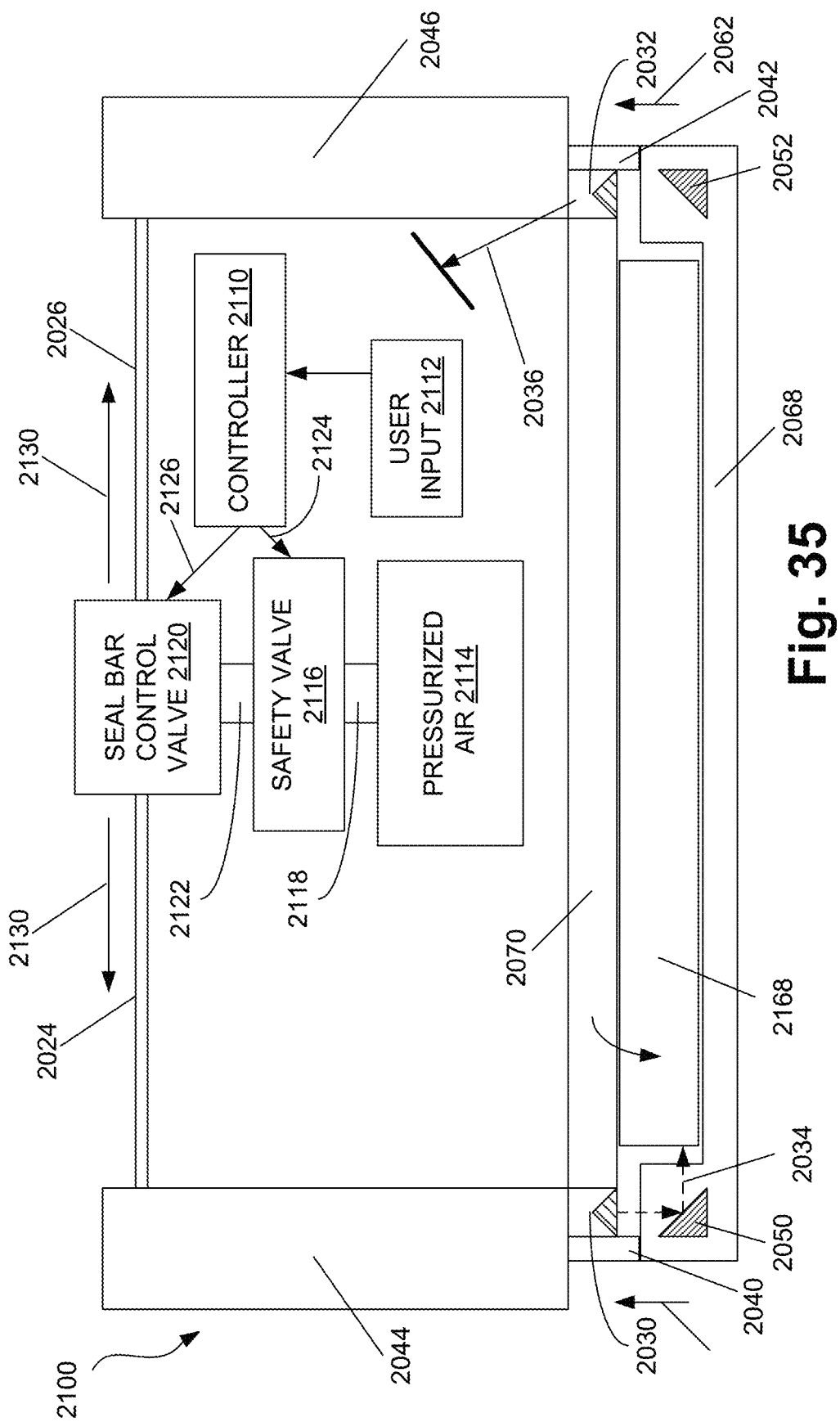
FIG. 35 is a schematic diagram of the second exemplary safety system shown at a fourth time after starting the sealing process with a seal bar tilted due to engagement with an obstruction.

In the exemplary embodiment illustrated in FIGS. 33-35, the safety system 2100 disables in the same manner that the safety system 2000 is disabled in FIGS. 24-26. As such, the disabling of FIGS. 33-35 is not described again in detail here.

Figure 36:
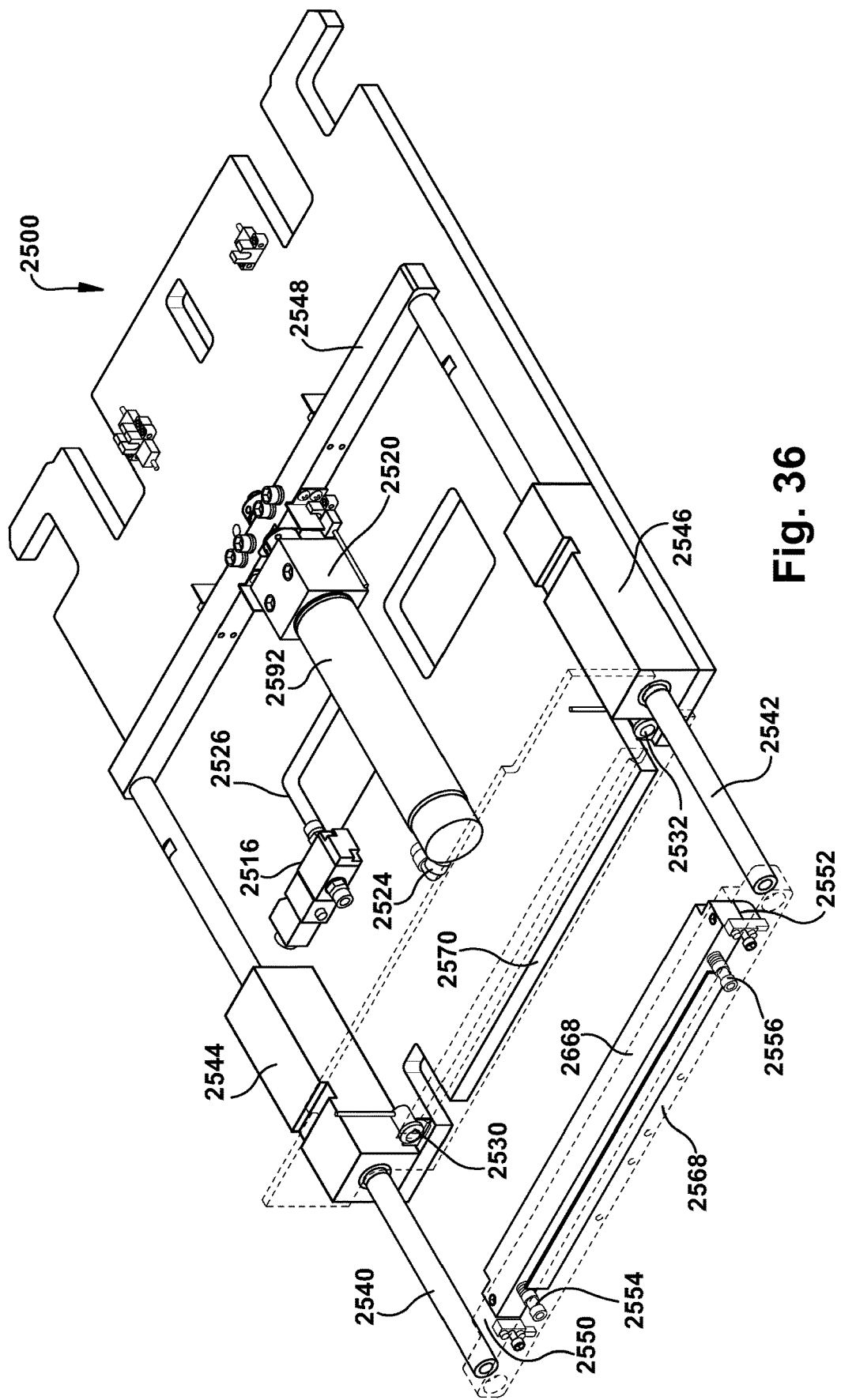
FIG. 36 is an isometric view of a third exemplary safety system shown prior to starting a sealing process.
Figure 37:
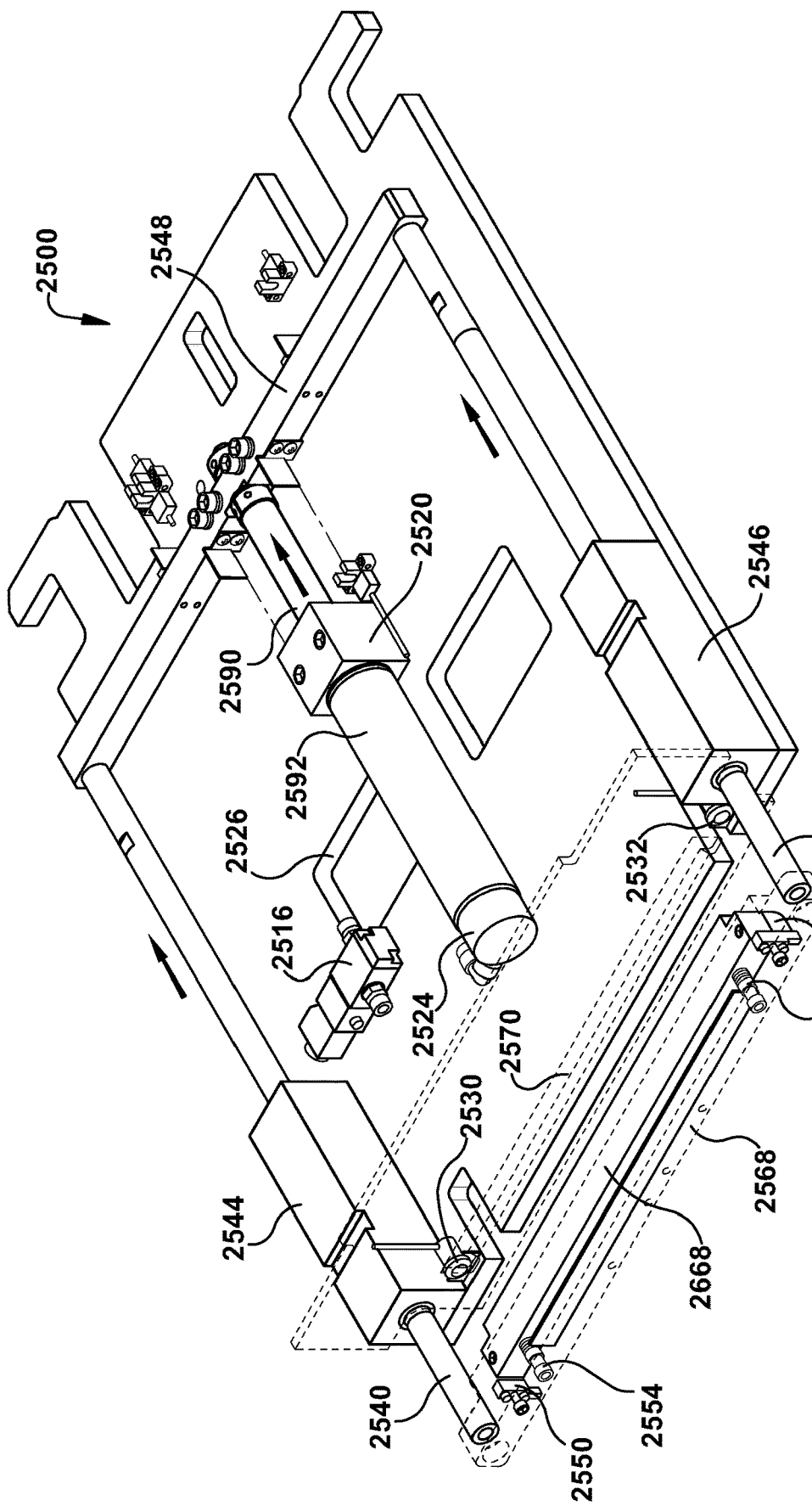
FIG. 37 is an isometric view of the third exemplary safety system shown after starting the sealing process.

FIGS. 36-37 depict an isometric view of an exemplary safety system 2500, in order to illustrate how the above-described components can be physically arranged. The exemplary safety system 2500 includes a heating element 2570 and a seal backing bar 2568 (which includes reflectors 2550 and 2552, rubber seal backing element 2668, and force generating members 2554 and 2556). The seal backing bar 2568 is connected to left and right arms 2540 and 2542, which are respectively slideably integrated through to left and right chambers 2546 and 2546 and further connected to a guide bar 2548. Movement of the guide bar 2548 forward and rearward is controlled by the connected piston 2590, which is slideably positioned within pneumatic chamber 2592. The pneumatic chamber 2592 is in fluid communication with a pair of conduits, 2524 and 2526, one of which is connected to a release valve 2516. The pneumatic chamber 2592 may also be connected to a valve 2520.

In operation, a pressurized air input (from a controller, not shown) into the pneumatic chamber 2592 will cause the piston 2590 to move out from the pneumatic chamber 2592, pushing the guide bar 2548 forward and, along with it, the arms 2540 and 2542 and the seal backing bar 2568 with all its accompanying components. Accordingly, the seal backing bar 2568 will move toward the heating element 2570 to seal opposing plies of a bag therebetween (not shown).

The safety system 2500 operates in the same manner described with respect to safety systems 2000 and 2100 of FIGS. 18-35. That is, the release valve 2516 is controlled based on the position of the seal backing bar 2568 components and the light detecting device 2532. As with the previous embodiments, before the seal backing bar 2568 comes within a predetermined distance of the heating element 2570, the safety system 2500 disables and/or opens the sealing device 2500 when the light from the transmitter 2530 to the receiver 2532 is blocked by the rubber seal backing element 2668. After the seal backing bar 2568 comes within a predetermined distance of the heating element 2570, the sealing device operates regardless of whether the light from the transmitter 2530 reaches the receiver 2532.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

What is claimed is:

1. A bagger safety system comprising:
 a controller;
 a heating element;
 a light-emitting device;
 a light-detecting device in electrical communication with the controller;
 a backing assembly comprising:
  a backing bar,
  a first reflector, a second reflector, and
a seal backing element movably coupled to the backing bar by at least one first mechanical force generating member so as to create a space between the seal backing element and the backing bar when no external force is applied to the at least one first mechanical force generating member;
a pressurized gas source;
a first gas valve in electrical communication with the controller and in fluid communication with the pressurized gas source;
a pneumatic chamber in fluid communication with the first gas valve;
a piston disposed at least partially within and movable relative to the pneumatic chamber; and
a second gas valve;
wherein the backing assembly is disposed opposite the heating element and is movable toward the heating element;
wherein movement of the backing assembly is controlled by the controller;
wherein light emitted from the light-emitting device reflects off the first reflector to the second reflector and off the second reflector to the light-detecting device when no external force is applied to the at least once first mechanical force generating member;
wherein movement of the seal backing element toward the backing bar prevents light emitted from the light-emitting device from reaching the light-detecting device;
wherein the controller controls movement of the backing assembly based on whether light from the light-emitting device reaches the light-detecting device;
wherein the piston is coupled to the backing assembly;
wherein the controller causes movement of the backing member toward the heating element by controlling the first gas valve to allow pressurized gas to flow from the first gas valve to the pneumatic chamber to apply a first force to the piston;
wherein the second gas valve is disposed between the first gas valve and the pressurized gas source and is in fluid communication with the first gas valve and the pressurized gas source, wherein the second gas valve is in electrical communication with the controller; and
wherein the controller causes movement of the backing assembly away from the heating element by controlling the second gas valve to allow pressurized gas to flow from the pneumatic chamber, through the first gas valve, and to the second gas valve.

2. The bagger safety system of claim 1, wherein the controller causes movement of the backing assembly away from the heating element by controlling the first gas valve to allow pressurized gas to flow from the pneumatic chamber to the first gas valve.

3. The bagger safety system of claim 1, wherein the piston is directly coupled to the backing assembly.

4. The bagger safety system of claim 1, further comprising a second mechanical force generator disposed within the pneumatic chamber, the second mechanical force generator configured to apply a second force to the piston that opposes the first force.

5. The bagger safety system of claim 1, wherein control of movement of the backing member based on whether light from the light-emitting device reaches the light-detecting device is disabled if a distance between the backing member and the heating element is below a pre-determined threshold.

6. A method for safely controlling a bagger system, the bagger system having a heating element and a backing assembly disposed opposite the heating element and being movable toward the heating element, the method comprising
emitting a beam of light toward the backing assembly;
reflecting the beam of light substantially parallel to the backing assembly between a backing element and a backing bar of the backing assembly;
wherein the backing element is movable in relation to the backing bar such that movement of the backing element toward the backing bar blocks the light beam;
detecting whether the light beam traveled past the backing element without being blocked by movement of the backing element;
controlling movement of the backing assembly in relation to the heating element based on the detecting of the light beam, the controlling further comprising:
causing movement of the backing member toward the heating element by controlling a first gas valve to allow pressurized gas to flow from a pressurized gas source through the first gas valve to a pneumatic chamber to apply a first force to a piston coupled to the backing assembly, wherein the pneumatic chamber is in fluid communication with the first gas valve, and wherein the piston is disposed at least partially within and movable relative to the pneumatic chamber,
causing movement of the backing assembly away from the heating element by controlling a second gas valve to allow pressurized gas to flow from the pneumatic chamber, through the first gas valve, and to the second gas valve, wherein the second gas valve is disposed between the first gas valve and the pressurized gas source and is in fluid communication with the first gas valve and the pressurized gas source.

7. The method of claim 6, further comprising:
detecting an external input; and
controlling movement of the backing assembly in relation to the heating element based on the external input.

8. The method of claim 6, further comprising:
detecting a distance between the backing assembly and the heating element; and
disabling any controlling based on detection of the light beam if the distance is below a predetermined threshold.

9. The method of claim 6, wherein causing the movement of the backing assembly away from the heating element further comprises controlling the first gas valve to allow pressurized gas to flow from the pneumatic chamber to the first gas valve.

10. The method of claim 6, wherein the piston is directly coupled to the backing assembly.

11. The method of claim 6, further comprising applying, by a second mechanical force generator, a second force to the piston that opposes the first force, wherein the second mechanical force generator is disposed within the pneumatic chamber.

12. The method of claim 6, further comprising disabling the controlling of the movement of the backing member based on whether light from the light-emitting device reaches the light-detecting device if a distance between the backing member and the heating element is below a pre-determined threshold.

* * * * *